US011879215B2

(12) United States Patent
Wang et al.

(10) Patent No.: US 11,879,215 B2
(45) Date of Patent: *Jan. 23, 2024

(54) FIBROUS STRUCTURES

(71) Applicant: The Procter & Gamble Company, Cincinnati, OH (US)

(72) Inventors: Fei Wang, Mason, OH (US); Douglas Jay Barkey, Salem Township, OH (US); James Allen Cain, Albany, GA (US); Stephen John Delvecchio, Cincinnati, OH (US); Angela Marie Leimbach, Hamilton, OH (US); Kun Piao, Deerfield Township, OH (US); James Kenneth Comer, West Chester, OH (US); Ryan Dominic Maladen, Anderson Township, OH (US)

(73) Assignee: The Procter & Gamble Company, Cincinnati, OH (US)

(*) Notice: Subject to any disclaimer, the term of this patent is extended or adjusted under 35 U.S.C. 154(b) by 108 days.

This patent is subject to a terminal disclaimer.

(21) Appl. No.: 17/500,628

(22) Filed: Oct. 13, 2021

(65) Prior Publication Data

US 2022/0064866 A1 Mar. 3, 2022

Related U.S. Application Data

(63) Continuation of application No. 16/707,256, filed on Dec. 9, 2019, now Pat. No. 11,162,224, which is a (Continued)

(51) Int. Cl.

*D21H 27/02* (2006.01)
*D21H 27/00* (2006.01)

(Continued)

(52) U.S. Cl.

CPC ............... *D21H 27/02* (2013.01); *D21F 1/10* (2013.01); *D21F 5/048* (2013.01); *D21F 5/181* (2013.01);

(Continued)

(58) Field of Classification Search

CPC .......... D21F 1/10; D21F 1/105; D21F 1/0027; D21F 1/0036; D21F 1/0063; D21F 5/18;

(Continued)

(56) References Cited

U.S. PATENT DOCUMENTS 2,742,823 A 4/1956 Compton
2,834,828 A 5/1958 Ebel (Continued)

FOREIGN PATENT DOCUMENTS

CA 2567189 A1 12/2005
DE 102006032233 A1 1/2008

(Continued)

OTHER PUBLICATIONS

All Office Actions U.S. Appl. No. 15/792,811.

(Continued)

*Primary Examiner* — Eric Hug
(74) *Attorney, Agent, or Firm* — James E. Oehlenschlager; C. Brant Cook

(57) ABSTRACT

Fibrous structures, and more particularly sanitary tissue products containing fibrous structures having a surface exhibiting a three-dimensional (3D) pattern such that the fibrous structure and/or sanitary tissue product exhibits novel properties compared to known fibrous structures and/or sanitary tissue products, and methods for making same are provided.

19 Claims, 19 Drawing Sheets

Related U.S. Application Data continuation of application No. 15/792,816, filed on Oct. 25, 2017, now Pat. No. 10,538,881.

(60) Provisional application No. 62/489,007, filed on Apr. 24, 2017, provisional application No. 62/412,455, filed on Oct. 25, 2016.

(51) Int. Cl.

| | |
|---|---|
| ***D21F 11/00*** | (2006.01) |
| ***D21H 27/40*** | (2006.01) |
| ***D21F 1/10*** | (2006.01) |
| ***D21F 5/04*** | (2006.01) |
| ***D21F 5/18*** | (2006.01) |
| ***D21F 9/02*** | (2006.01) |
| ***D21H 25/00*** | (2006.01) |
| ***D21H 21/14*** | (2006.01) |
| *B31F 1/12* | (2006.01) |
| *D21F 3/04* | (2006.01) |
| *D21G 3/00* | (2006.01) |
| *B31F 1/16* | (2006.01) |
| *D21H 21/20* | (2006.01) |

(52) U.S. Cl.

CPC .............. *D21F 9/02* (2013.01); *D21F 11/006* (2013.01); *D21H 21/146* (2013.01); *D21H 25/005* (2013.01); *D21H 27/002* (2013.01); *D21H 27/004* (2013.01); *D21H 27/005* (2013.01); *D21H 27/007* (2013.01); *D21H 27/008* (2013.01); *D21H 27/40* (2013.01); *B31F 1/126* (2013.01); *B31F 1/16* (2013.01); *D21F 3/045* (2013.01); *D21F 5/188* (2013.01); *D21G 3/005* (2013.01); *D21H 21/20* (2013.01)

(58) Field of Classification Search

CPC . D21F 5/181; D21F 5/185; D21F 7/08; D21F 7/083; D21F 7/12; D21F 11/006; D21F 11/14; D21F 11/145; D21H 27/002; D21H 27/004; D21H 27/005; D21H 27/007; D21H 27/02; B31F 1/07; B31F 1/12; B31F 1/122; B31F 1/124; B31F 1/126; B31F 1/128; B31F 1/16

USPC ..... 162/109–117, 280, 296, 348, 358.2, 361, 162/362, 900, 902, 903

See application file for complete search history.

(56) References Cited

U.S. PATENT DOCUMENTS

| | | | |
|---|---|---|---|
| 2,946,725 A | | 7/1960 | Norris |
| 3,070,510 A | | 12/1962 | Cooley |
| 3,111,127 A | | 11/1963 | Jarboe |
| 3,535,421 A | | 10/1970 | Briner |
| 3,538,230 A | | 11/1970 | Pader |
| 3,678,154 A | | 7/1972 | Widder |
| 3,862,307 A | | 1/1975 | Di Giulio |
| 3,917,613 A | | 11/1975 | Humbert et al. |
| 3,991,178 A | | 11/1976 | Humbert et al. |
| 4,029,759 A | | 6/1977 | Humbert et al. |
| 4,051,234 A | | 9/1977 | Gieske |
| 4,070,496 A | | 1/1978 | Rowsell et al. |
| 4,136,163 A | | 1/1979 | Watson |
| 4,150,052 A | | 4/1979 | Watson |
| 4,153,679 A | | 5/1979 | Rowsell |
| 4,157,384 A | | 6/1979 | Browning |
| 4,178,459 A | | 12/1979 | Rowsell |
| 4,206,215 A | | 6/1980 | Bailey |
| 4,230,688 A | | 10/1980 | Rowsell |
| 4,340,583 A | | 7/1982 | Wason |
| 4,459,425 A | | 7/1984 | Amano |
| 4,514,345 A | | 4/1985 | Johnson |
| 4,966,754 A | | 10/1990 | Purohit et al. |
| 5,004,597 A | | 4/1991 | Majeti |
| 5,180,577 A | | 1/1993 | Polefka |
| 5,266,592 A | | 11/1993 | Grub et al. |
| 5,281,410 A | | 1/1994 | Lukacovic |
| 5,322,689 A | | 6/1994 | Hughes et al. |
| 5,328,565 A | | 7/1994 | Rasch |
| 5,399,412 A | | 3/1995 | Sudall et al. |
| 5,451,404 A | | 9/1995 | Furman |
| 5,503,715 A | | 4/1996 | Trokhan et al. |
| 5,578,293 A | | 11/1996 | Prencipe |
| 5,589,160 A | | 12/1996 | Rice |
| 5,603,920 A | | 2/1997 | Rice |
| 5,608,119 A | | 3/1997 | Amano et al. |
| 5,628,876 A | | 5/1997 | Ayers |
| 5,637,194 A | * | 6/1997 | Ampulski ............. D21F 11/006 428/153 |
| 5,651,958 A | | 7/1997 | Rice |
| 5,658,553 A | | 8/1997 | Rice |
| 5,703,123 A | | 12/1997 | Pelzer et al. |
| 5,714,041 A | | 2/1998 | Ayers |
| 5,716,601 A | | 2/1998 | Rice |
| 5,725,865 A | | 3/1998 | Mane et al. |
| 5,843,466 A | | 12/1998 | Mane et al. |
| 5,904,811 A | | 5/1999 | Ampulski |
| 5,977,166 A | | 11/1999 | Greenberg |
| 6,117,270 A | * | 9/2000 | Trokhan ................ D21F 11/006 428/137 |
| 6,193,847 B1 | | 2/2001 | Trokhan |
| 6,197,288 B1 | | 3/2001 | Mankoo |
| 6,335,180 B1 | | 1/2002 | Julius et al. |
| 6,365,215 B1 | | 4/2002 | Grainger et al. |
| 6,451,844 B1 | | 9/2002 | Watkins et al. |
| 6,464,831 B1 | | 10/2002 | Trokhan et al. |
| 6,592,884 B2 | | 7/2003 | Hofmann et al. |
| 6,660,129 B1 | | 12/2003 | Cabell et al. |
| 6,673,844 B2 | | 1/2004 | Kumamoto et al. |
| 6,790,629 B2 | | 9/2004 | Julius et al. |
| 6,867,009 B2 | | 3/2005 | Cortright et al. |
| 6,884,903 B2 | | 4/2005 | Lorenz et al. |
| 6,890,567 B2 | | 5/2005 | Nakatsu et al. |
| 6,956,139 B2 | | 10/2005 | Green et al. |
| 7,094,320 B1 | | 8/2006 | Phan |
| 7,097,991 B2 | | 8/2006 | Julius et al. |
| 7,128,809 B2 | | 10/2006 | Vinson |
| 7,132,000 B2 | | 11/2006 | Muerner et al. |
| 7,166,195 B2 | | 1/2007 | Hawes |
| 7,186,803 B2 | | 3/2007 | Dubin et al. |
| 7,189,760 B2 | | 3/2007 | Erman et al. |
| 7,465,581 B2 | | 12/2008 | Bevan et al. |
| 7,691,229 B2 | | 4/2010 | Vinson |
| 7,914,649 B2 | | 3/2011 | Ostendorf |
| 7,915,207 B2 | | 3/2011 | Herdt et al. |
| 7,919,624 B2 | | 4/2011 | Baraldi et al. |
| D672,966 S | | 12/2012 | Sheehan et al. |
| 8,461,145 B2 | | 6/2013 | Gijsen et al. |
| 8,506,759 B2 | | 8/2013 | Spitzer et al. |
| 8,569,505 B2 | | 10/2013 | Codd et al. |
| 8,592,621 B2 | | 11/2013 | Ley et al. |
| 9,044,429 B2 | | 6/2015 | Bakes et al. |
| 9,340,914 B2 | | 5/2016 | Manifold et al. |
| 9,427,415 B2 | | 8/2016 | Sreekrishna et al. |
| 9,937,115 B2 | | 4/2018 | Haught et al. |
| 10,538,881 B2 | * | 1/2020 | Wang ................... D21H 21/146 |
| 10,745,865 B2 | | 8/2020 | Wang et al. |
| 11,162,224 B2 | * | 11/2021 | Wang ........................ D21F 1/10 |
| 2002/0119231 A1 | | 8/2002 | Kumamoto et al. |
| 2003/0044573 A1 | | 3/2003 | Rasch et al. |
| 2003/0203196 A1 | | 10/2003 | Trokhan |
| 2004/0052735 A1 | | 3/2004 | Nakatsu et al. |
| 2004/0084167 A1 | | 5/2004 | Vinson et al. |
| 2004/0187226 A1 | | 9/2004 | Muerner et al. |
| 2005/0238701 A1 | | 10/2005 | Kleinwaechter |
| 2005/0245407 A1 | | 11/2005 | Ishihara |
| 2005/0266435 A1 | | 12/2005 | Hackos et al. |
| 2006/0013837 A1 | | 1/2006 | Haines |
| 2006/0029628 A1 | | 2/2006 | Kleinwaechter |
| 2006/0088697 A1 | | 4/2006 | Manifold et al. |
| 2006/0154886 A1 | | 7/2006 | Weihe et al. |

(56) References Cited

U.S. PATENT DOCUMENTS

| | | | |
|---|---|---|---|
| 2006/0204466 | A1 | 9/2006 | Littau et al. |
| 2007/0036733 | A1 | 2/2007 | Spence et al. |
| 2007/0137812 | A1 | 6/2007 | Shannon et al. |
| 2007/0190090 | A1 | 8/2007 | Brown |
| 2007/0297993 | A1 | 12/2007 | Kindel et al. |
| 2008/0153845 | A1 | 6/2008 | Palmer et al. |
| 2008/0175801 | A1 | 7/2008 | Ramji |
| 2008/0245498 | A1 | 10/2008 | Ostendorf et al. |
| 2008/0311054 | A1 | 12/2008 | Natsch |
| 2009/0081153 | A1 | 3/2009 | Scott et al. |
| 2009/0098213 | A1 | 4/2009 | Tran |
| 2009/0131302 | A1 | 5/2009 | Pasricha et al. |
| 2009/0175882 | A1 | 7/2009 | Patapoutian et al. |
| 2010/0119779 | A1 | 5/2010 | Ostendorf et al. |
| 2010/0183524 | A1 | 7/2010 | Zielinski et al. |
| 2010/0278991 | A1 | 11/2010 | Haught et al. |
| 2010/0297400 | A1 | 11/2010 | Mellin et al. |
| 2010/0314059 | A1 | 12/2010 | Edwards et al. |
| 2010/0316615 | A1 | 12/2010 | Kurreck et al. |
| 2011/0077275 | A1 | 3/2011 | Zielinski et al. |
| 2011/0104301 | A1 | 5/2011 | Ahern et al. |
| 2011/0124666 | A1 | 5/2011 | Gijsen et al. |
| 2011/0178181 | A1 | 7/2011 | Bakes et al. |
| 2011/0311345 | A1 | 12/2011 | Mcneil |
| 2012/0082628 | A1 | 4/2012 | Haught |
| 2012/0088774 | A1 | 4/2012 | Grahek et al. |
| 2012/0121737 | A1 | 5/2012 | Vielhaber et al. |
| 2013/0143001 | A1 | 6/2013 | Manifold et al. |
| 2013/0315843 | A1 | 11/2013 | Haught et al. |
| 2013/0319625 | A1 | 12/2013 | Mohammadi et al. |
| 2014/0050675 | A1 | 2/2014 | Zielinski et al. |
| 2015/0176216 | A1 | 6/2015 | Ostendorf et al. |
| 2015/0176218 | A1 | 6/2015 | Maladen et al. |
| 2015/0176220 | A1 | 6/2015 | Ostendorf et al. |
| 2015/0225903 | A1 | 8/2015 | Jeannot et al. |
| 2015/0272907 | A1 | 10/2015 | Sreekrishna et al. |
| 2015/0330030 | A1 | 11/2015 | Dwiggins |
| 2015/0352801 | A1 | 12/2015 | Margo Moreno |
| 2016/0090692 | A1 | 3/2016 | Eagles |
| 2016/0090693 | A1 | 3/2016 | Eagles |
| 2016/0090698 | A1 | 3/2016 | Sze et al. |
| 2016/0145809 | A1 | 5/2016 | Hermans et al. |
| 2016/0158136 | A1 | 6/2016 | Haught et al. |
| 2016/0331659 | A1 | 11/2016 | Sreekrishna et al. |
| 2018/0112357 | A1 | 4/2018 | Wang et al. |
| 2018/0112358 | A1 | 4/2018 | Wang et al. |
| 2018/0112361 | A1 | 4/2018 | Wang et al. |
| 2018/0280562 | A1 | 10/2018 | Salaam-Zayid et al. |
| 2020/0109520 | A1 | 4/2020 | Wang et al. |
| 2020/0354896 | A1 | 11/2020 | Wang et al. |
| 2022/0178076 | A1 | 6/2022 | Wang et al. |

FOREIGN PATENT DOCUMENTS

| | | | |
|---|---|---|---|
| EP | 310299 | | 4/1989 |
| EP | 1217106 | A1 | 6/2002 |
| EP | 1644578 | A1 | 4/2006 |
| EP | 1600151 | B1 | 8/2008 |
| JP | 2006065044 | A | 3/2006 |
| JP | 2011136953 | A | 7/2011 |
| JP | 2011205975 | A | 10/2011 |
| JP | 2012062304 | A | 3/2012 |
| JP | 2012080840 | A | 4/2012 |
| WO | 0135768 | A1 | 5/2001 |
| WO | 2004043169 | A1 | 5/2004 |
| WO | 2005049553 | A1 | 6/2005 |
| WO | 2006103401 | A2 | 10/2006 |
| WO | 2009087242 | A2 | 7/2009 |
| WO | 2011019342 | A2 | 2/2011 |
| WO | 2011034868 | A1 | 3/2011 |
| WO | 2013176897 | A2 | 11/2013 |

OTHER PUBLICATIONS

All Office Actions U.S. Appl. No. 15/792,816.
All Office Actions U.S. Appl. No. 15/792,821.
All Office Actions U.S. Appl. No. 15/792,824.
All Office Actions; U.S. Appl. No. 16/707,256.
International Search Report and Written Opinion; Application Ser. No. PCT/US2017/058174; dated Jan. 29, 2018,14 pages.
1,8—Cineole Causes Comfortable Cooling Sensationby Concomitant Application With MENTHOLIFSCC 2011 Conference Proceeding BookIFSCC pp. 226-231, 2011.
All Office Actions; U.S. Appl. No. 17/936,535, filed Sep. 29, 2022.
An-Guo Ying,et al., "Green and efficient aza-Michael additions of aromatic amines toα,β-unsaturated ketones catalyzed by DBU based task-specific ionicliquids without solvent" 11 pages.
Chambers et al. "Measuring Intracellular Calcium Fluxes in High ThroughputMode", Combinatorial Chemistry & High Throughput Screening, 2003, 6, D£S. 355-362.
Database GNPD [Online]; MINTEL; Feb. 28, 2009 (Feb. 28, 2009),Anonymous: "Whitening mouthwash", retrieved from : YY.~. YLW.mLfQP.}, Databaseaccession No. 1051335.
Fischer et al., "Direct Evidence For Functional TRPVI/TRP Al Heteromers", Pfluegers Archiv (2014), 466 (12), pp. 2229-2241.
Gunthorpe Martin J et al: 11 Peripheral TRPV1 receptors as targets for drugdevelopment: new molecules andmechanisms 11,Current Pharmaceutical Design, Benthamscience Publishers Ltd, NL,vol. 14, No. 1,Jan. 1, 2008 (Jan. 1, 2008), pp. 32-41,XP002498636,ISSN: 1873-4286, DOI:10.2174/138161208783330754* p. 32 ** figures 2, 3 *.
John. Read: "Recent Progress in the Menthone Chemistry", Chemical Reviews, vol. 7, No. 1, Mar. 1, 1930 (Mar. 1, 1930), pp. 1-50, XP055113072, ISSN: 0009-2665, 001: 10.1021 lcr60025a001.
Joris Vriens, Giovanni Appendino, and Bernd Nilius, "Pharmacology ofVanilloid Transient Receptor Potential Cation Channels", Molecularpharmacology, vol. 75 No. 6, Mar. 18, 2009 pp. 1262-1279.
Lam, "Activation of recombinant human TRPV1 receptors expressed in SH-SY5Y humanneuroblastoma cells increases [Cali, initiates neurotransmitter release and promotesdelayed cell death.", Journal of neurochemistry, 102, pp. 801-811, 2007.
Michele C. Jetter, Mark A Youngman, James J. McNally, Sui-Po Zhang, Adrienne E.Dubin, Nadia Nasserb and Scott L. Dax. N-Isoquinolin-5-yl-N'-aralkyl-urea and -amideantagonists of human vanilloid receptor 1. Bioorganic & Medicinal Chemistry Letters14 (2004) 3053-3056.
Mihara et al. "The role of flavor and fragrance chemicals in TRPA1 (transient receptor potential cation channel,member A1) activity associated with allergies" dated 2015, 12 pages.
Mitchell, Jennifer E. et al. "Expression and characterization of the intracellularvanilloid receptor (TRPVI) in bronchi from patients with chronic cough", ExperimentalLung Research, vol. 31, No. 3, Apr. 1, 2005, pp. 295-306.
Patricia M. W. Lam, Atticus H. Hainsworth, Graham D. Smith, Davina E. Owen, JamesDavies and David 0. Lambert. Activation of recombinant human TRPVI receptorsexpressed in SH-SY5Y human neuroblastoma cells increases [Ca2 +]i, initiatesneurotransmitter release and promotes delayed cell death. Journal ofNeurochemistry,2007' 102, 801-811.
Pier Giovanni Baraldi et al: "Transient Receptor Potential Ankyrin 1 (TRPAI)Channel as Emerging Target for NovelAnalgesics and Anti-Inflammatory Agents", Journal of Medicinal Chemistry, vol. 53, No. 14, Jul. 22, 2010 (2010-07-22), pp. 5085-5107, XP055031281,ISSN: 0022-2623, DOI: 10.1021/jml00062h* p. 5085-p. 5086 ** p. 5093, right-hand column *.
Sadofsky, Laura R. et al., "Unique Responses are Observed in Transient ReceptorPotential Ankyrin 1 and Vanilloid 1 (TRPAI and TRPVI) Co-Expressing Cells.", Cells2014, vol. 3, No. 2, 2014, ogs. 616-626.
Sadofsky, LR et al. "Characterisation of a HEK293 cell line permanently coexpressingthe cough receptors Transient Receptor Potential Ankyrin 1 and V anilloid 1(TRPAI and TRPVI)", Pulmomary Pharmacology & Therapeutics, Academic Press,GB, vol. 24, No. 3, Jun. 1, 2010, og. e8.

(56) References Cited

OTHER PUBLICATIONS

Sreekrishna et al., "Modulation of Transient Receptor Potential (TRP) ChannelsBy Chinese Herbal Extracts", Pulmonary Pharmacology & Therapeutics, 2010, 24(3),p. 8.
Takaishi et al., "1,8-cineole, a TRPM8 agonist, is a novel natural antagonistof human TRPA1", Molecular pain, 8(86), pp. 1-12, Jan. 1, 2012 (Jan. 1, 2012).
U.S. Appl. No. 17/936,535, filed Sep. 29, 2022, to Fei Wang et al.
Yansong, Zhang et al. "Modulation of Transient Receptor Potential (TRP) Channels by Chinese Herbal Extracts", Phytotherapy Research, vol. 25, No. 11, Mar. 23, 2011, pp. 1666-1670.

* cited by examiner

FIBROUS STRUCTURES

FIELD OF THE INVENTION

The present invention relates to fibrous structures, and more particularly to sanitary tissue products comprising fibrous structures having a surface comprising a three-dimensional (3D) pattern such that the fibrous structure and/or sanitary tissue product exhibits novel properties compared to known fibrous structures and/or sanitary tissue products, and methods for making same.

BACKGROUND OF THE INVENTION

Known 3D patterned fibrous structures and/or sanitary tissue products fail to exhibit a combination of Total Pillow Perimeter value of at least 30 in/in$^2$ as measured according to the Total Pillow Perimeter Test Method and a Surface Void Volume value at 1.7 psi of at least 0.090 mm$^3$/mm$^2$ and/or a Surface Void Volume value at 0.88 psi of at least 0.108 mm$^3$/mm$^2$ as measured according to the Surface Void Volume Test Method.

It has been found that the 3D patterns of the known fibrous structures, for example as shown in FIGS. 1A and 1B, which illustrates a patterned molding member that imparts a 3D pattern of semi-continuous pillow and semi-continuous knuckles to a fibrous structure fails to retain sufficient Surface Void Volume during use by consumers to provide consumer desirable cleaning performance after bowel movements. As shown in FIGS. 1A and 1B, the known patterned molding member comprises a molding member 10, for example a through-air-drying belt. The molding member 10 comprises a plurality of semi-continuous knuckles 12 formed by semi-continuous line segments of resin 14 arranged in a non-random, repeating pattern, for example a substantially machine direction repeating pattern of semi-continuous lines supported on a support fabric ("reinforcing member") comprising filaments 16. In this case, the semi-continuous lines are curvilinear, for example sinusoidal. The semi-continuous knuckles 12 are spaced from adjacent semi-continuous knuckles 12 by semi-continuous pillows 18, which constitute deflection conduits into which portions of a fibrous structure ply being made on the molding member 10 of FIGS. 1A and 1B deflect. The resulting fibrous structure being made on the molding member 10 of FIGS. 1A and 1B comprises semi-continuous pillow regions imparted by the semi-continuous pillows of the molding member 10 of FIGS. 1A and 1B and semi-continuous non-pillow regions, for example semi-continuous knuckle regions imparted by the semi-continuous knuckles of the molding member 10 of FIGS. 1A and 1B. The semi-continuous pillow regions and semi-continuous knuckle regions may exhibit different densities, for example, one or more of the semi-continuous knuckle regions may exhibit a density that is greater than the density of one or more of the semi-continuous pillow regions.

One problem faced by formulators is to provide a 3D patterned fibrous structure that exhibits sufficient Surface Void Volume values at 1.7 psi and/or 0.88 psi to achieve Surface Void Volume values of at least 0.090 mm$^3$/mm$^2$ and/or at least 0.108 mm$^3$/mm$^2$, respectively, as measured according to the Surface Void Volume Test Method described herein wherein the 3D patterned fibrous structure exhibits a Total Pillow Perimeter of at least 30 in/in$^2$ as measured according to the Total Pillow Perimeter Test Method described herein.

Accordingly, there is a need for a 3D patterned fibrous structure that exhibits a Total Pillow Perimeter value of at least 30 in/in$^2$ and a Surface Void Volume value at 1.7 psi of at least 0.090 mm$^3$/mm$^2$ and/or a Surface Void Volume value at 0.88 psi of at least 0.108 mm$^3$/mm$^2$ as measured according to the Surface Void Volume Test Method.

SUMMARY OF THE INVENTION

The present invention fulfills the need described above by providing a 3D patterned fibrous structure and/or sanitary tissue product that exhibits a Total Pillow Perimeter value of at least 30 in/in$^2$ and a Surface Void Volume value at 1.7 psi of at least 0.090 mm$^3$/mm$^2$ and/or a Surface Void Volume value at 0.88 psi of at least 0.108 mm$^3$/mm$^2$ as measured according to the Surface Void Volume Test Method.

One solution to the problem set forth above is achieved by making the sanitary tissue products or at least one fibrous structure ply employed in the sanitary tissue products on patterned molding members that impart three-dimensional (3D) patterns, which exhibit a Total Pillow Perimeter value of at least 30 in/in$^2$ as measured according to the Total Pillow Perimeter Test Method, to the sanitary tissue products and/or fibrous structure plies made thereon, wherein the patterned molding members are designed such that the resulting 3D patterned fibrous structures and/or sanitary tissue products, for example bath tissue products, made using the patterned molding members exhibit greater Surface Void Volume values, for example a Surface Void Volume value at 1.7 psi of at least 0.090 mm$^3$/mm$^2$ and/or a Surface Void Volume value at 0.88 psi of at least 0.108 mm$^3$/mm$^2$ as measured according to the Surface Void Volume Test Method described herein, which translates into a 3D surface pattern that retains more of its initial Surface Void Volume under pressure than known 3D patterned fibrous structures thus resulting in the fibrous structures exhibiting better cleaning performance, for example after a bowel movement. Non-limiting examples of such patterned molding members include patterned felts, patterned forming wires, patterned rolls, patterned fabrics, and patterned belts utilized in conventional wet-pressed papermaking processes, air-laid papermaking processes, and/or wet-laid papermaking processes that produce 3D patterned sanitary tissue products and/or 3D patterned fibrous structure plies employed in sanitary tissue products. Other non-limiting examples of such patterned molding members include through-air-drying fabrics and through-air-drying belts utilized in through-air-drying papermaking processes that produce through-air-dried sanitary tissue products, for example 3D patterned through-air dried sanitary tissue products, and/or through-air-dried fibrous structure plies, for example 3D patterned through-air-dried fibrous structure plies, employed in sanitary tissue products.

In one example of the present invention, a fibrous structure comprising a surface comprising a three-dimensional surface pattern ("a 3D patterned fibrous structure"), wherein the three-dimensional surface pattern comprises one or more pillow regions and one or more non-pillow regions, wherein the surface exhibits a Total Pillow Perimeter value of at least 30 in/in$^2$ as measured according to the Total Pillow Perimeter Test Method such that the fibrous structure exhibits a Surface Void Volume value at 1.7 psi of at least 0.090 mm$^3$/mm$^2$ as measured according to the Surface Void Volume Test Method, is provided.

In another example of the present invention, a fibrous structure comprising a surface comprising a three-dimensional surface pattern ("a 3D patterned fibrous structure"), wherein the three-dimensional surface pattern comprises one or more pillow regions and one or more non-pillow regions, wherein the surface exhibits a Total Pillow Perimeter value of at least 30 in/in$^2$ as measured according to the Total Pillow Perimeter Test Method such that the fibrous structure exhibits a Surface Void Volume value at 0.88 psi of at least 0.108 mm$^3$/mm$^2$ as measured according to the Surface Void Volume Test Method, is provided.

In yet another example of the present invention, s multi-ply fibrous structure comprising at least one fibrous structure ply comprising a 3D patterned fibrous structure according to the present invention and a second fibrous structure ply, the same or different from the first ply, is provided.

In even another example of the present invention, a method for making a fibrous structure according to the present invention, the method comprising the steps of:

a. providing a plurality of fibrous elements;
b. collecting the fibrous elements on a collection device to form a fibrous structure; and
c. imparting a three-dimensional surface pattern to a surface of the fibrous structure such that the fibrous structure comprises a three-dimensional surface pattern ("a 3D patterned fibrous structure") comprising one or more pillow regions and one or more non-pillow regions, wherein the surface of the fibrous structure exhibits a Total Pillow Perimeter of at least 30 in/in$^2$ as measured according to the Total Pillow Perimeter Test Method such that the fibrous structure exhibits a Surface Void Volume value at 1.7 psi of at least 0.090 mm$^3$/mm$^2$ as measured according to the Surface Void Volume Test Method is provided.

In even yet another example of the present invention, a method for making a fibrous structure according to the present invention, the method comprising the steps of:

a. providing a plurality of fibrous elements;
b. collecting the fibrous elements on a collection device to form a fibrous structure; and
c. imparting a three-dimensional surface pattern to a surface of the fibrous structure such that the fibrous structure comprises a three-dimensional surface pattern ("a 3D patterned fibrous structure") comprising one or more pillow regions and one or more non-pillow regions, wherein the surface of the fibrous structure exhibits a Total Pillow Perimeter of at least 30 in/in$^2$ as measured according to the Total Pillow Perimeter Test Method such that the fibrous structure exhibits a Surface Void Volume value at 0.88 psi of at least 0.108 mm$^3$/mm$^2$ as measured according to the Surface Void Volume Test Method is provided.

Accordingly, the present invention provides a 3D patterned fibrous structure that exhibits a Total Pillow Perimeter value of at least 30 in/in$^2$ as measured according to the Total Pillow Perimeter Test Method and a Surface Void Volume value at 1.7 psi of at least 0.090 mm$^3$/mm$^2$ and/or a Surface Void Volume value at 0.88 psi of at least 0.108 mm$^3$/mm$^2$ as measured according to the Surface Void Volume Test Method.

DETAILED DESCRIPTION OF THE INVENTION

Definitions

Figure 1A:
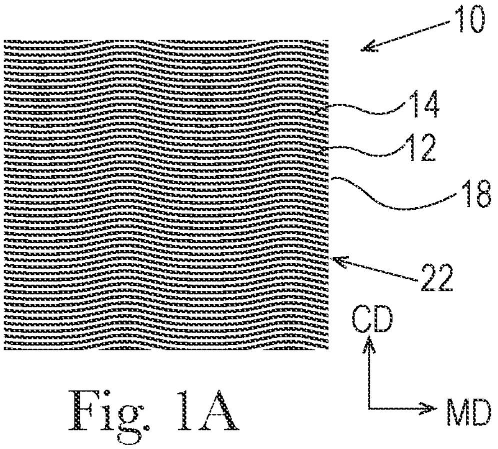
Fig. 1A PRIOR ART
FIG. 1A is a schematic representation of an example of a Prior Art molding member that imparts a 3D pattern to a fibrous structure.

"Sanitary tissue product" as used herein means a soft, low density (i.e. <about 0.15 g/cm$^3$) article comprising one or more fibrous structure plies according to the present invention, wherein the sanitary tissue product is useful as a wiping implement for post-urinary and post-bowel movement cleaning (toilet tissue), for otorhinolaryngological discharges (facial tissue), and multi-functional absorbent and cleaning uses (absorbent towels). The sanitary tissue product may be convolutedly wound upon itself about a core or without a core to form a sanitary tissue product roll.

The sanitary tissue products and/or fibrous structures of the present invention may exhibit a basis weight of greater than 15 g/m$^2$ to about 120 g/m$^2$ and/or from about 15 g/m$^2$ to about 110 g/m$^2$ and/or from about 20 g/m$^2$ to about 100 g/m$^2$ and/or from about 30 to 90 g/m$^2$. In addition, the sanitary tissue products and/or fibrous structures of the present invention may exhibit a basis weight between about 40 g/m$^2$ to about 120 g/m$^2$ and/or from about 50 g/m$^2$ to about 110 g/m$^2$ and/or from about 55 g/m$^2$ to about 105 g/m$^2$ and/or from about 60 to 100 g/m$^2$.

The sanitary tissue products of the present invention may exhibit a sum of MD and CD dry tensile strength of greater than about 59 g/cm (150 g/in) and/or from about 78 g/cm to about 394 g/cm and/or from about 98 g/cm to about 335 g/cm. In addition, the sanitary tissue product of the present invention may exhibit a sum of MD and CD dry tensile strength of greater than about 196 g/cm and/or from about 196 g/cm to about 394 g/cm and/or from about 216 g/cm to about 335 g/cm and/or from about 236 g/cm to about 315 g/cm. In one example, the sanitary tissue product exhibits a sum of MD and CD dry tensile strength of less than about 394 g/cm and/or less than about 335 g/cm.

In another example, the sanitary tissue products of the present invention may exhibit a sum of MD and CD dry tensile strength of greater than about 196 g/cm and/or greater than about 236 g/cm and/or greater than about 276 g/cm and/or greater than about 315 g/cm and/or greater than about 354 g/cm and/or greater than about 394 g/cm and/or from about 315 g/cm to about 1968 g/cm and/or from about 354 g/cm to about 1181 g/cm and/or from about 354 g/cm to about 984 g/cm and/or from about 394 g/cm to about 787 g/cm.

The sanitary tissue products of the present invention may exhibit an initial sum of MD and CD wet tensile strength of less than about 78 g/cm and/or less than about 59 g/cm and/or less than about 39 g/cm and/or less than about 29 g/cm.

The sanitary tissue products of the present invention may exhibit an initial sum of MD and CD wet tensile strength of greater than about 118 g/cm and/or greater than about 157 g/cm and/or greater than about 196 g/cm and/or greater than about 236 g/cm and/or greater than about 276 g/cm and/or greater than about 315 g/cm and/or greater than about 354 g/cm and/or greater than about 394 g/cm and/or from about 118 g/cm to about 1968 g/cm and/or from about 157 g/cm to about 1181 g/cm and/or from about 196 g/cm to about 984 g/cm and/or from about 196 g/cm to about 787 g/cm and/or from about 196 g/cm to about 591 g/cm.

The sanitary tissue products of the present invention may exhibit a density (based on measuring caliper at 95 g/in$^2$) of less than about 0.60 g/cm$^3$ and/or less than about 0.30 g/cm$^3$ and/or less than about 0.20 g/cm$^3$ and/or less than about 0.10 g/cm$^3$ and/or less than about 0.07 g/cm$^3$ and/or less than about 0.05 g/cm$^3$ and/or from about 0.01 g/cm$^3$ to about 0.20 g/cm$^3$ and/or from about 0.02 g/cm$^3$ to about 0.10 g/cm$^3$.

The sanitary tissue products of the present invention may be in the form of sanitary tissue product rolls. Such sanitary tissue product rolls may comprise a plurality of connected, but perforated sheets of fibrous structure, that are separably dispensable from adjacent sheets.

In another example, the sanitary tissue products may be in the form of discrete sheets that are stacked within and dispensed from a container, such as a box.

The fibrous structures and/or sanitary tissue products of the present invention may comprise additives such as surface softening agents, for example silicones, quaternary ammonium compounds, aminosilicones, lotions, and mixtures thereof, temporary wet strength agents, permanent wet strength agents, bulk softening agents, wetting agents, latexes, especially surface-pattern-applied latexes, dry strength agents such as carboxymethylcellulose and starch, and other types of additives suitable for inclusion in and/or on sanitary tissue products.

"Fibrous structure" as used herein means a structure that comprises a plurality of pulp fibers. In one example, the fibrous structure may comprise a plurality of wood pulp fibers. In another example, the fibrous structure may comprise a plurality of non-wood pulp fibers, for example plant fibers, synthetic staple fibers, and mixtures thereof. In still another example, in addition to pulp fibers, the fibrous structure may comprise a plurality of filaments, such as polymeric filaments, for example thermoplastic filaments such as polyolefin filaments (i.e., polypropylene filaments) and/or hydroxyl polymer filaments, for example polyvinyl alcohol filaments and/or polysaccharide filaments such as starch filaments. In one example, a fibrous structure according to the present invention means an orderly arrangement of fibers alone and with filaments within a structure in order to perform a function. Non-limiting examples of fibrous structures of the present invention include paper.

Non-limiting examples of processes for making fibrous structures include known wet-laid papermaking processes, for example conventional wet-pressed papermaking processes and through-air-dried papermaking processes, and air-laid papermaking processes. Such processes typically include steps of preparing a fiber composition in the form of a suspension in a medium, either wet, more specifically aqueous medium, or dry, more specifically gaseous, i.e. with air as medium. The aqueous medium used for wet-laid processes is oftentimes referred to as a fiber slurry. The fibrous slurry is then used to deposit a plurality of fibers onto a forming wire, fabric, or belt such that an embryonic fibrous structure is formed, after which drying and/or bonding the fibers together results in a fibrous structure. Further processing the fibrous structure may be carried out such that a finished fibrous structure is formed. For example, in typical papermaking processes, the finished fibrous structure is the fibrous structure that is wound on the reel at the end of papermaking, often referred to as a parent roll, and may subsequently be converted into a finished product, e.g. a single- or multi-ply sanitary tissue product.

Fibrous structures such as paper towels, bath tissues and facial tissues are typically made in a "wet laying" process in which a slurry of fibers, usually wood pulp fibers, is deposited onto a forming wire and/or one or more papermaking belts such that an embryonic fibrous structure can be formed, after which drying and/or bonding the fibers together results in a fibrous structure. Further processing the fibrous structure can be carried out such that a finished fibrous structure can be formed. For example, in typical papermaking processes, the finished fibrous structure is the fibrous structure that is wound on the reel at the end of papermaking, and can subsequently be converted into a finished product (e.g., a sanitary tissue product) by ply-bonding and embossing, for example. In general, the finished product can be converted "wire side out" or "fabric side out" which refers to the orientation of the sanitary tissue product during manufacture. That is, during manufacture, one side of the fibrous structure faces the forming wire, and the other side faces the papermaking belt, such as the papermaking belt disclosed herein.

The wet-laying process can be designed such that the finished fibrous structure has visually distinct features produced in the wet-laying process. Any of the various forming wires and papermaking belts utilized can be designed to leave a physical, three-dimensional impression in the finished paper. Such three-dimensional impressions are well known in the art, particularly in the art of "through air drying" (TAD) processes, with such impressions often being referred to a "knuckles" and "pillows." Knuckles are typically relatively high density regions corresponding to the "knuckles" of a papermaking belt, i.e., the filaments or resinous structures that are raised at a higher elevation than other portions of the belt. Likewise, "pillows" are typically relatively low density regions formed in the finished fibrous structure at the relatively uncompressed regions between or around knuckles. Further, the knuckles and pillows in a fibrous structure can exhibit a range of densities relative to one another.

Thus, in the description below, the term "knuckles" or "knuckle region," or the like can be used for either the raised portions of a papermaking belt or the densified portions formed in the paper made on the papermaking belt, and the meaning should be clear from the context of the description herein. Likewise "pillow" or "pillow region" or the like can be used for either the portion of the papermaking belt between, within, or around knuckles (also referred to in the art as "deflection conduits" or "pockets"), or the relatively uncompressed regions between, within, or around knuckles in the paper made on the papermaking belt, and the meaning should be clear from the context of the description herein. In general, knuckles or pillows can each be either continuous, semi-continuous or discrete, as described herein.

Knuckles and pillows in paper towels and bath tissue can be visible to the retail consumer of such products. The knuckles and pillows can be imparted to a fibrous structure from a papermaking belt in various stages of production, i.e., at various consistencies and at various unit operations during the drying process, and the visual pattern generated by the pattern of knuckles and pillows can be designed for functional performance enhancement as well as to be visually appealing. Such patterns of knuckles and pillows can be made according to the methods and processes described in U.S. Pat. No. 6,610,173, issued to Lindsay et al. on Aug. 26, 2003, or U.S. Pat. No. 4,514,345 issued to Trokhan on Apr. 30, 1985, or U.S. Pat. No. 6,398,910 issued to Burazin et al. on Jun. 4, 2002, or US Pub. No. 2013/0199741; published in the name of Stage et al. on Aug. 8, 2013. The Lindsay, Trokhan, Burazin and Stage disclosures describe belts that are representative of papermaking belts made with cured polymer on a woven reinforcing member, of which the present invention is an improvement. But further, the present improvement can be utilized as a fabric crepe belt as disclosed in U.S. Pat. No. 7,494,563, issued to Edwards et al. on Feb. 24, 2009 or U.S. Pat. No. 8,152,958, issued to Super et al. on Apr. 10, 2012, as well as belt crepe belts, as described in U.S. Pat. No. 8,293,072, issued to Super et al on Oct. 23, 2012. When utilized as a fabric crepe belt, a papermaking belt of the present invention can provide the relatively large recessed pockets and sufficient knuckle dimensions to redistribute the fiber upon high impact creping in a creping nip between a backing roll and the fabric to form additional bulk in conventional wet press processes. Likewise, when utilized as a belt in a belt crepe method, a papermaking belt of the present invention can provide the fiber enriched dome regions arranged in a repeating pattern corresponding to the pattern of the papermaking belt, as well as the interconnected plurality of surround areas to form additional bulk and local basis weight distribution in a conventional wet press process.

Figure 1B:
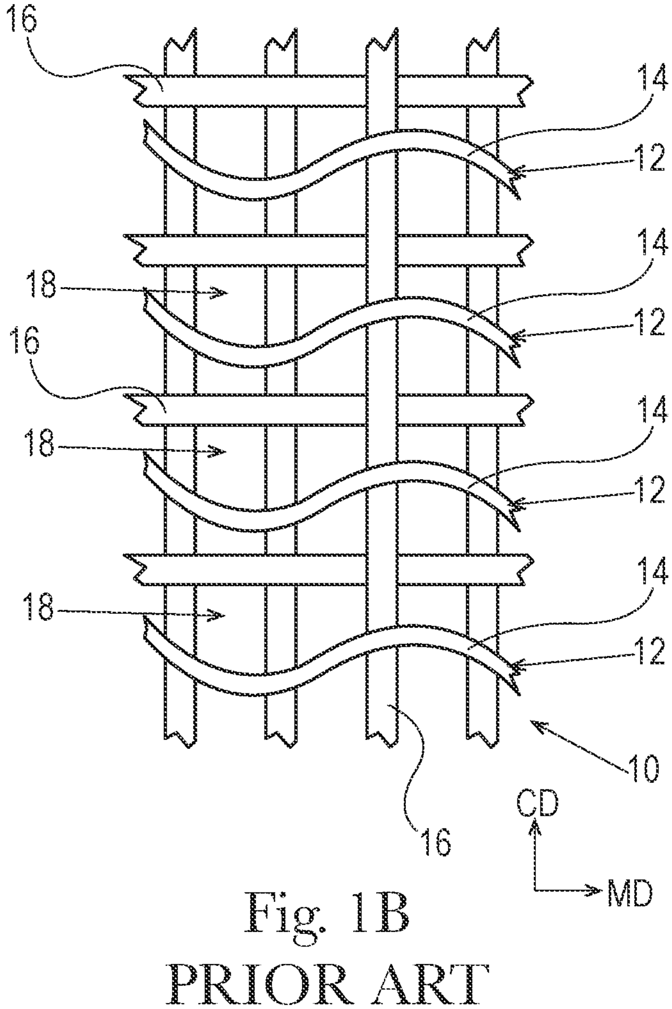
Fig. 1B PRIOR ART
FIG. 1B is an enlarged portion of the Prior Art molding member of FIG. 1A.

An example of a papermaking belt structure of the type useful in the present invention and made according to the disclosure of U.S. Pat. No. 4,514,345 is shown in FIG. 1. As shown, the papermaking belt 2 can include cured resin elements 4 forming knuckles 20 on a woven reinforcing member 6. The reinforcing member 6 can be made of woven filaments 8 as is known in the art of papermaking belts, including resin coated papermaking belts. The papermaking belt structure shown in FIG. 1 includes discrete knuckles 20 and a continuous deflection conduit, or pillow region 18. The discrete knuckles 20 can form densified knuckles 20' in the fibrous structure made thereon; and, likewise, the continuous deflection conduit, i.e., pillow region 18, can form a continuous pillow region 18' in the fibrous structure made thereon. The knuckles can be arranged in a pattern described with reference to an X-Y plane, and the distance between knuckles 20 in at least one of X or Y directions can vary according to the present invention disclosed herein. In general, the X-Y plane also corresponds to the machine direction, MD, and cross machine direction, CD, of a papermaking belt.

A second way to provide visually perceptible features to a fibrous structure like a paper towel or bath tissue is embossing. Embossing is a well known converting process in which at least one embossing roll having a plurality of discrete embossing elements extending radially outwardly from a surface thereof can be mated with a backing, or anvil, roll to form a nip in which the fibrous structure can pass such that the discrete embossing elements compress the fibrous structure to form relatively high density discrete elements in the fibrous structure while leaving uncompressed, or substantially uncompressed, relatively low density continuous or substantially continuous network at least partially defining or surrounding the relatively high density discrete elements.

Embossed features in paper towels and bath tissues can be visible to the retail consumer of such products. As a result, the visual pattern generated by the pattern of knuckles and pillows can be designed to be visually appealing. Such patterns are well known in the art, and can be made according to the methods and processes described in US Pub. No. US 2010-0028621 A1 in the name of Byrne et al. or US 2010-0297395 A1 in the name of Mellin, or U.S. Pat. No. 8,753,737 issued to McNeil et al. on Jun. 17, 2014.

In an embodiment, a fibrous structure of the present invention has a pattern of knuckles and pillows imparted to it by a papermaking belt having a corresponding pattern of knuckles and pillows that provides for superior product performance and can be visually appealing to a retail consumer.

In an embodiment, a fibrous structure of the present invention has a pattern of knuckles and pillows imparted to it by a papermaking belt having a corresponding pattern of knuckles and an emboss pattern, which together with the knuckles and pillows provides for an overall visual appearance that is appealing to a retail consumer.

In an embodiment, a fibrous structure of the present invention has a pattern of knuckles and pillows imparted to it by a papermaking belt having a corresponding pattern of knuckles, an emboss pattern, which together with the knuckles and pillows provides for an overall visual appearance that is appealing to a retail consumer, and exhibits superior product performance over known fibrous structures.

The fibrous structures of the present invention may be homogeneous or may be layered. If layered, the fibrous structures may comprise at least two and/or at least three and/or at least four and/or at least five layers of fiber and/or filament compositions.

In one example, the fibrous structure of the present invention consists essentially of fibers, for example pulp fibers, such as cellulosic pulp fibers and more particularly wood pulp fibers.

In another example, the fibrous structure of the present invention comprises fibers and is void of filaments.

In still another example, the fibrous structures of the present invention comprises filaments and fibers, such as a co-formed fibrous structure.

"Co-formed fibrous structure" as used herein means that the fibrous structure comprises a mixture of at least two different materials wherein at least one of the materials comprises a filament, such as a polypropylene filament, and at least one other material, different from the first material, comprises a solid additive, such as a fiber and/or a particulate. In one example, a co-formed fibrous structure comprises solid additives, such as fibers, such as wood pulp fibers, and filaments, such as polypropylene filaments.

"Fiber" and/or "Filament" as used herein means an elongate particulate having an apparent length greatly exceeding its apparent width, i.e. a length to diameter ratio of at least about 10. In one example, a "fiber" is an elongate particulate as described above that exhibits a length of less than 5.08 cm (2 in.) and a "filament" is an elongate particulate as described above that exhibits a length of greater than or equal to 5.08 cm (2 in.).

Fibers are typically considered discontinuous in nature. Non-limiting examples of fibers include pulp fibers, such as wood pulp fibers, and synthetic staple fibers such as polyester fibers. Filaments are typically considered continuous or substantially continuous in nature.

Filaments are relatively longer than fibers. Non-limiting examples of filaments include meltblown and/or spunbond filaments. Non-limiting examples of materials that can be spun into filaments include natural polymers, such as starch, starch derivatives, cellulose and cellulose derivatives, hemicellulose, hemicellulose derivatives, and synthetic polymers including, but not limited to polyvinyl alcohol filaments and/or polyvinyl alcohol derivative filaments, and thermoplastic polymer filaments, such as polyesters, nylons, polyolefins such as polypropylene filaments, polyethylene filaments, and biodegradable or compostable thermoplastic fibers such as polylactic acid filaments, polyhydroxyalkanoate filaments and polycaprolactone filaments. The filaments may be monocomponent or multicomponent, such as bicomponent filaments.

In one example of the present invention, "fiber" refers to papermaking fibers. Papermaking fibers useful in the present invention include cellulosic fibers commonly known as wood pulp fibers. Applicable wood pulps include chemical pulps, such as Kraft, sulfite, and sulfate pulps, as well as mechanical pulps including, for example, groundwood, thermomechanical pulp and chemically modified thermomechanical pulp. Chemical pulps, however, may be preferred since they impart a superior tactile sense of softness to tissue sheets made therefrom. Pulps derived from both deciduous trees (hereinafter, also referred to as "hardwood") and coniferous trees (hereinafter, also referred to as "softwood") may be utilized. The hardwood and softwood fibers can be blended, or alternatively, can be deposited in layers to provide a stratified fibrous structure. U.S. Pat. Nos. 4,300,981 and 3,994,771 are incorporated herein by reference for the purpose of disclosing layering of hardwood and softwood fibers. Also applicable to the present invention are fibers derived from recycled paper, which may contain any or all of the above categories as well as other non-fibrous materials such as fillers and adhesives used to facilitate the original papermaking. In one example, the wood pulp fibers are selected from the group consisting of hardwood pulp fibers, softwood pulp fibers, and mixtures thereof. The hardwood pulp fibers may be selected from the group consisting of: tropical hardwood pulp fibers, northern hardwood pulp fibers, and mixtures thereof. The tropical hardwood pulp fibers may be selected from the group consisting of: eucalyptus fibers, acacia fibers, and mixtures thereof. The northern hardwood pulp fibers may be selected from the group consisting of: cedar fibers, maple fibers, and mixtures thereof.

In addition to the various wood pulp fibers, other cellulosic fibers such as cotton linters, rayon, lyocell, trichomes, seed hairs, and bagasse can be used in this invention. Other sources of cellulose in the form of fibers or capable of being spun into fibers include grasses and grain sources.

"Trichome" or "trichome fiber" as used herein means an epidermal attachment of a varying shape, structure and/or function of a non-seed portion of a plant. In one example, a trichome is an outgrowth of the epidermis of a non-seed portion of a plant. The outgrowth may extend from an epidermal cell. In one embodiment, the outgrowth is a trichome fiber. The outgrowth may be a hairlike or bristle-like outgrowth from the epidermis of a plant.

Trichome fibers are different from seed hair fibers in that they are not attached to seed portions of a plant. For example, trichome fibers, unlike seed hair fibers, are not attached to a seed or a seed pod epidermis. Cotton, kapok, milkweed, and coconut coir are non-limiting examples of seed hair fibers.

Further, trichome fibers are different from nonwood bast and/or core fibers in that they are not attached to the bast, also known as phloem, or the core, also known as xylem portions of a nonwood dicotyledonous plant stem. Non-limiting examples of plants which have been used to yield nonwood bast fibers and/or nonwood core fibers include kenaf, jute, flax, ramie and hemp. Further trichome fibers are different from monocotyledonous plant derived fibers such as those derived from cereal straws (wheat, rye, barley, oat, etc), stalks (corn, cotton, sorghum, *Hesperaloe funifera*, etc.), canes (bamboo, bagasse, etc.), grasses (esparto, lemon, sabai, switchgrass, etc), since such monocotyledonous plant derived fibers are not attached to an epidermis of a plant.

Further, trichome fibers are different from leaf fibers in that they do not originate from within the leaf structure. Sisal and abaca are sometimes liberated as leaf fibers.

Finally, trichome fibers are different from wood pulp fibers since wood pulp fibers are not outgrowths from the epidermis of a plant; namely, a tree. Wood pulp fibers rather originate from the secondary xylem portion of the tree stem.

"Basis Weight" as used herein is the weight per unit area of a sample reported in lbs/3000 $ft^2$ or $g/m^2$ (gsm) and is measured according to the Basis Weight Test Method described herein. "Machine Direction" or "MD" as used herein means the direction parallel to the flow of the fibrous structure through the fibrous structure making machine and/or sanitary tissue product manufacturing equipment.

"Cross Machine Direction" or "CD" as used herein means the direction parallel to the width of the fibrous structure making machine and/or sanitary tissue product manufacturing equipment and perpendicular to the machine direction.

"Ply" as used herein means an individual, integral fibrous structure.

"Plies" as used herein means two or more individual, integral fibrous structures disposed in a substantially contiguous, face-to-face relationship with one another, forming a multi-ply fibrous structure and/or multi-ply sanitary tissue product. It is also contemplated that an individual, integral fibrous structure can effectively form a multi-ply fibrous structure, for example, by being folded on itself.

"Embossed" as used herein with respect to a fibrous structure and/or sanitary tissue product means that a fibrous structure and/or sanitary tissue product has been subjected to a process which converts a smooth surfaced fibrous structure and/or sanitary tissue product to a decorative surface by replicating a design on one or more emboss rolls, which form a nip through which the fibrous structure and/or sanitary tissue product passes. Embossed does not include creping, microcreping, printing or other processes that may also impart a texture and/or decorative pattern to a fibrous structure and/or sanitary tissue product.

"Differential density", as used herein, means a fibrous structure and/or sanitary tissue product that comprises one or more regions of relatively low fiber density, which are referred to as pillow regions, and one or more regions of relatively high fiber density, which are referred to as knuckle regions.

"Densified", as used herein means a portion of a fibrous structure and/or sanitary tissue product that is characterized by regions of relatively high fiber density (knuckle regions).

"Non-densified", as used herein, means a portion of a fibrous structure and/or sanitary tissue product that exhibits a lesser density (one or more regions of relatively lower fiber density) (pillow regions) than another portion (for example a knuckle region) of the fibrous structure and/or sanitary tissue product.

"Non-rolled" as used herein with respect to a fibrous structure and/or sanitary tissue product of the present invention means that the fibrous structure and/or sanitary tissue product is an individual sheet (for example not connected to adjacent sheets by perforation lines. However, two or more individual sheets may be interleaved with one another) that is not convolutedly wound about a core or itself. For example, a non-rolled product comprises a facial tissue.

"Creped" as used herein means creped off of a Yankee dryer or other similar roll and/or fabric creped and/or belt creped. Rush transfer of a fibrous structure alone does not result in a "creped" fibrous structure or "creped" sanitary tissue product for purposes of the present invention.

"Relatively low density" as used herein means a portion of a fibrous structure having a density that is lower than a relatively high density portion of the fibrous structure.

"Relatively high density" as used herein means a portion of a fibrous structure having a density that is higher than a relatively low density portion of the fibrous structure.

"Substantially semi-continuous" or "semi-continuous" region refers an area on a sheet of sanitary tissue product which has "continuity" in at least one direction parallel to the first plane, but not all directions, and in which area one can connect any two points by an uninterrupted line running entirely within that area throughout the line's length. Semi-continuous knuckles, for example, may have continuity only in one direction parallel to the plane of a papermaking belt. Minor deviations from such continuity may be tolerable as long as those deviations do not appreciably affect the performance of the fibrous structure.

"Substantially continuous" or "continuous" region refers to an area within which one can connect any two points by an uninterrupted line running entirely within that area throughout the line's length. That is, the substantially continuous region has a substantial "continuity" in all directions parallel to the plane of a papermaking belt and is terminated only at edges of that region. The term "substantially," in conjunction with continuous, is intended to indicate that while an absolute continuity is preferred, minor deviations from the absolute continuity may be tolerable as long as those deviations do not appreciably affect the performance of the fibrous structure (or a molding member) as designed and intended.

"Discontinuous" or "discrete" regions or zones refer to areas that are separated from one another areas or zones that are discontinuous in all directions parallel to the first plane.

"Discrete deflection cell" also referred to a "discrete pillow" means a portion of a papermaking belt or fibrous structure defined or surrounded by a substantially continuous knuckle portion.

"Discrete raised portion" means a discrete knuckle, i.e., a portion of a papermaking belt or fibrous structure defined or surrounded by, or at least partially defined or surrounded by, a substantially continuous pillow region.

Fibrous Structure

The fibrous structures of the present invention may be single-ply or multi-ply fibrous structures. In other words, the fibrous structures of the present invention may comprise one or more fibrous structures of the present invention. In one example, the fibrous structures of the present invention comprise a plurality of pulp fibers, for example wood pulp fibers and/or other cellulosic pulp fibers (non-wood pulp fibers), for example trichomes. In addition to the pulp fibers, the fibrous structures of the present invention may comprise synthetic fibers and/or filaments.

Figure 2:
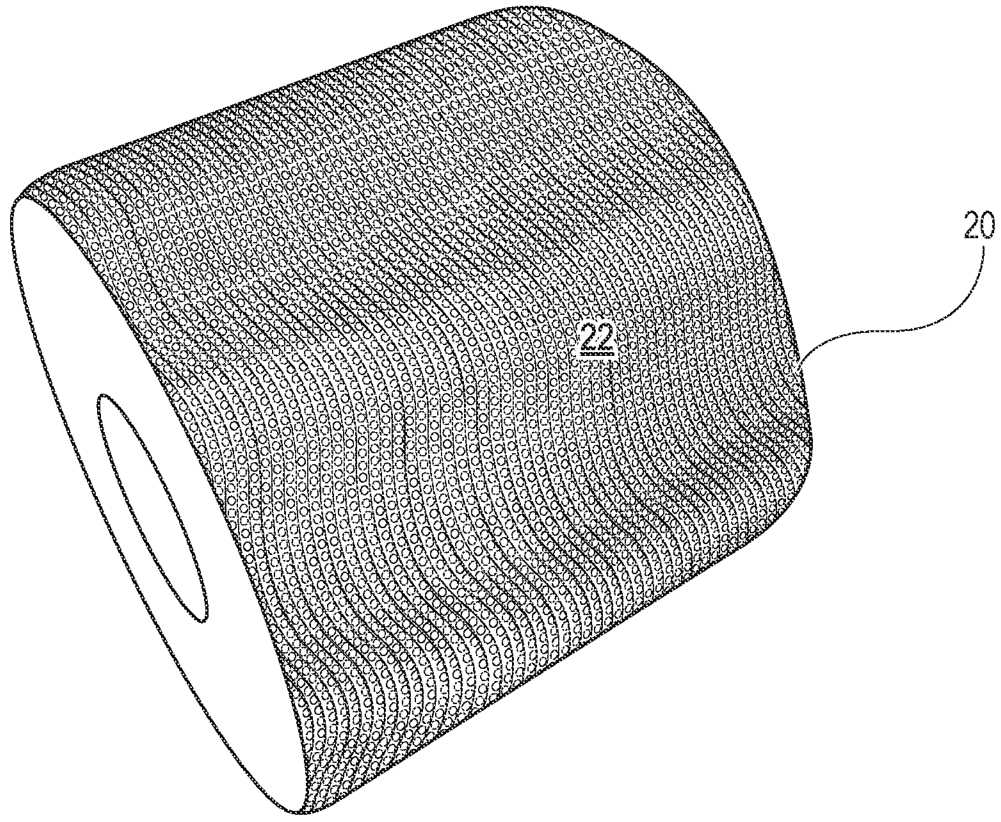
FIG. 2 is a photograph of a roll of sanitary tissue product comprising an example of a fibrous structure according to the present invention.
Figure 3:
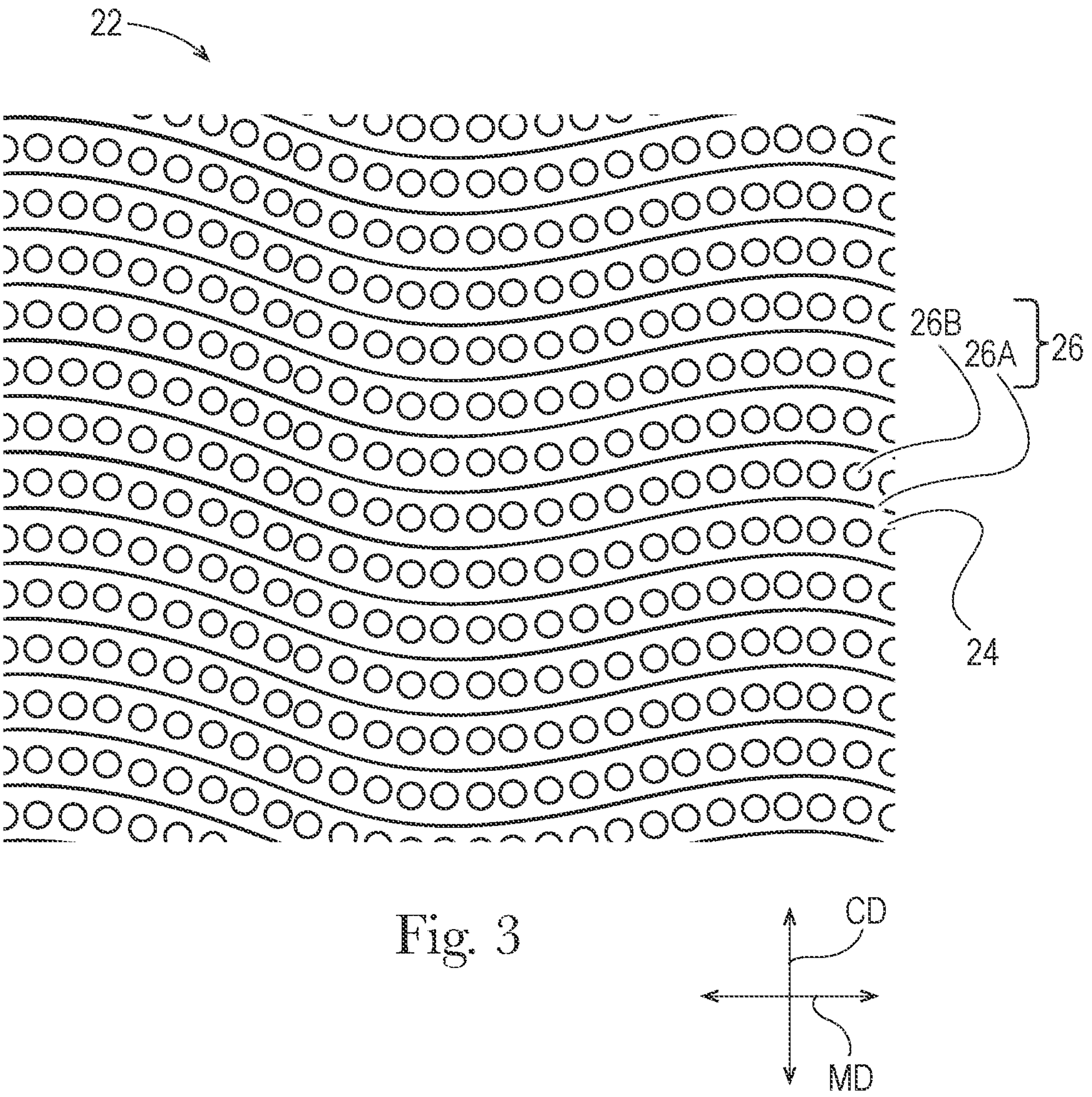
FIG. 3 is an enlarged portion of the photograph of FIG. 2.

FIG. 2 illustrates an example of a roll 20 of a fibrous structure 22 and/or sanitary tissue product comprising a fibrous structure of the present invention FIG. 3 is a magnified view of the fibrous structure 22 of FIG. 2 showing non-pillow regions 24, for example semi-continuous knuckles, and pillow regions 26, for example discrete pillow regions 26A and semi-continuous pillow regions 26B. As shown in FIG. 3, the fibrous structure 22 exhibits a pattern of semi-continuous non-pillow regions 24, for example knuckle regions, which are imparted to the fibrous structure 22 by semi-continuous knuckles 12 on a molding member 10 upon which the fibrous structure is made. The fibrous structure 22 further comprises one or more pillow regions 26, in this case one or more discrete pillow regions 26A and one or more semi-continuous pillow regions 26A.

As shown in Table 1 below, the fibrous structures of the present invention exhibit a combination of Total Pillow Perimeter values as measured according to the Total Pillow Perimeter Test Method described herein and Surface Void Volume values as measured according to the Surface Void Volume Test Method described herein that are novel over known fibrous structures.

TABLE 1

| Sample | Surface Void Volume at 0.88 psi ($mm^3/mm^2$) | Surface Void Volume at 1.7 psi ($mm^3/mm^2$) | Total Pillow Perimeter ($in/in^2$) | Semi-Continuous Pillow Perimeter ($in/in^2$) | Discrete Pillow Perimeter ($in/in^2$) |
|---|---|---|---|---|---|
| Inventive Sample - WSO | 0.118 | 0.102 | 33.03 | 14.70 | 18.34 |
| Inventive Sample - WSO | 0.112 | 0.099 | 33.03 | 14.70 | 18.34 |
| Inventive Sample - FSO | 0.110 | 0.090 | 33.03 | 14.70 | 18.34 |
| Prior Art FIGS. 2A & 2B - FSO (U.S. Pat. No. 9,340,914) | 0.106 | 0.087 | 29.04 | 29.04 | 0 |
| Cottonelle ® Clean Care ® | 0.107 | 0.089 | 12.88 | 12.88 | 0 |

In one example of the present invention, the fibrous structure of the present invention exhibits a Total Pillow Perimeter value of at least 30 and/or at least 30.5 and/or at least 31 and/or at least 32 and/or at least 33 $in/in^2$ as measured according to the Total Pillow Perimeter Test Method described herein.

In addition, the fibrous structure's Total Pillow Perimeter value may comprise one or more Semi-Continuous Pillow regions that exhibit a Semi-Continuous Pillow Perimeter value and/or one or more Discrete Pillow Region that exhibit a Discrete Pillow Perimeter value. In one example, the fibrous structure of the present invention comprises one or more semi-continuous pillow regions and one or more discrete pillow regions, which exhibit their respective Semi-Continuous Pillow Perimeter value and Discrete Pillow Perimeter value. In one example, the fibrous structure comprises one or more semi-continuous pillow regions and one or more discrete pillow regions present at a ratio of Semi-Continuous Pillow Perimeter value to Discrete Pillow Perimeter value of less than 4:1 and/or less than 3:1 and/or less than 2:1 and/or less than 1.5:1 and/or about 1:1 as measured according to the Total Pillow Perimeter Test Method described herein. In another example, the fibrous structure comprises one or more semi-continuous pillow regions and one or more discrete pillow regions present at a ratio of Semi-Continuous Pillow Perimeter value to Discrete Pillow Perimeter value of greater than 1:4 and/or greater than 1:3 and/or greater than 1:2 and/or greater than 1.5:1 as measured according to the Total Pillow Perimeter Test Method described herein.

The fibrous structure of the present invention may comprise one or more semi-continuous pillow regions such that the fibrous structure exhibits a Semi-Continuous Pillow Perimeter value of at least 2.00 and/or at least 5.00 and/or at least 10.00 and/or at least 14.00 $in/in^2$ as measured according to the Total Pillow Perimeter Test Method described herein.

The fibrous structure of the present invention may comprise one or more discrete pillow regions such that the fibrous structure exhibits a Discrete Pillow Perimeter value of at least 5.00 and/or at least 10.00 and/or at least 15.00 and/or at least 18.00 $in/in^2$ as measured according to the Total Pillow Perimeter Test Method described herein.

The fibrous structures of the present invention may exhibit a Surface Void Volume value at 1.7 psi of at least 0.092 and/or at least 0.095 and/or at least 0.097 and/or at least 0.099 and/or at least 0.101 $mm^3/mm^2$ as measured according to the Surface Void Volume Test Method described herein. In addition, the fibrous structures of the present invention may exhibit a Surface Void Volume value at 0.88 psi of at least 0.108 and/or at least 0.109 and/or at least 0.110 and/or at least 0.112 and/or at least 0.114 and/or at least 0.116 and/or at least 0.118 $mm^3/mm^2$ as measured according to the Surface Void Volume Test Method described herein.

The fibrous structures of the present invention may exhibit a Surface Void Volume value at 0.88 psi of at least 0.108 and/or at least 0.109 and/or at least 0.110 and/or at least 0.112 and/or at least 0.114 and/or at least 0.116 and/or at least 0.118 $mm^3/mm^2$ as measured according to the Surface Void Volume Test Method described herein.

The fibrous structures and/or sanitary tissue products of the present invention may be creped or uncreped.

The fibrous structures and/or sanitary tissue products of the present invention may be wet-laid or air-laid.

The fibrous structures and/or sanitary tissue products of the present invention may be embossed.

The fibrous structures and/or sanitary tissue products of the present invention may comprise a surface softening agent or be void of a surface softening agent. In one example, the sanitary tissue product is a non-lotioned sanitary tissue product, such as a sanitary tissue product comprising a non-lotioned fibrous structure ply, for example a non-lotioned through-air-dried fibrous structure ply, for example a non-lotioned creped through-air-dried fibrous structure ply and/or a non-lotioned uncreped through-air-dried fibrous structure ply. In yet another example, the sanitary tissue product may comprise a non-lotioned fabric creped fibrous structure ply and/or a non-lotioned belt creped fibrous structure ply.

The fibrous structures and/or sanitary tissue products of the present invention may comprise trichome fibers and/or may be void of trichome fibers.

The fibrous structures and/or sanitary tissue products of the present invention may comprise a temporary wet strength agent and/or may be void of a permanent wet strength agent.

The fibrous structures of the present disclosure can be single-ply or multi-ply fibrous structures and can comprise cellulosic pulp fibers. Other naturally-occurring and/or non-naturally occurring fibers can also be present in the fibrous structures. In one example, the fibrous structures can be throughdried in a TAD process, thus producing what is referred to as "TAD paper". The fibrous structures can be wet-laid fibrous structures and can be incorporated into single- or multi-ply sanitary tissue products.

The fibrous structures of the invention will be described in the context of bath tissue, and in the context of a papermaking belt comprising cured resin on a woven reinforcing member. However, the invention is not limited to bath tissues and can be utilized in other known processes that impart the knuckles and pillow patterns describe herein, including, for example, the fabric crepe and belt crepe processes described above, modified as described herein to produce the papermaking belts and paper of the invention.

In an effort to improve the product performance properties of, for example, current CHARMIN® bath tissue, the inventors designed a new pattern for the distribution of knuckles and pillows that provides for relatively higher substrate volume that holds up under pressure. It is believed that the increased substrate volume under pressure contributes to better cleaning when used to wipe skin surfaces.

Patterned Molding Members

The fibrous structures of the present invention are formed on patterned molding members that result in the fibrous structures of the present invention. In one example, the pattern molding member comprises a non-random repeating pattern that imparts one or more pillow regions and one or more non-pillow regions to the fibrous structure of the present invention. In another example, the pattern molding member comprises a resinous pattern, which may applied to a reinforcement element, for example via printing and/or extruding.

A "reinforcing member" may be a desirable (but not necessary) element in some examples of the molding member, serving primarily to provide or facilitate integrity, stability, and durability of the molding member comprising, for example, a resinous material. The reinforcing member can be fluid-permeable or partially fluid-permeable, may have a variety of embodiments and weave patterns, and may comprise a variety of materials, such as, for example, a plurality of interwoven yarns (including Jacquard-type and the like woven patterns), a felt, a plastic, other suitable synthetic material, or any combination thereof.

Figure 4:
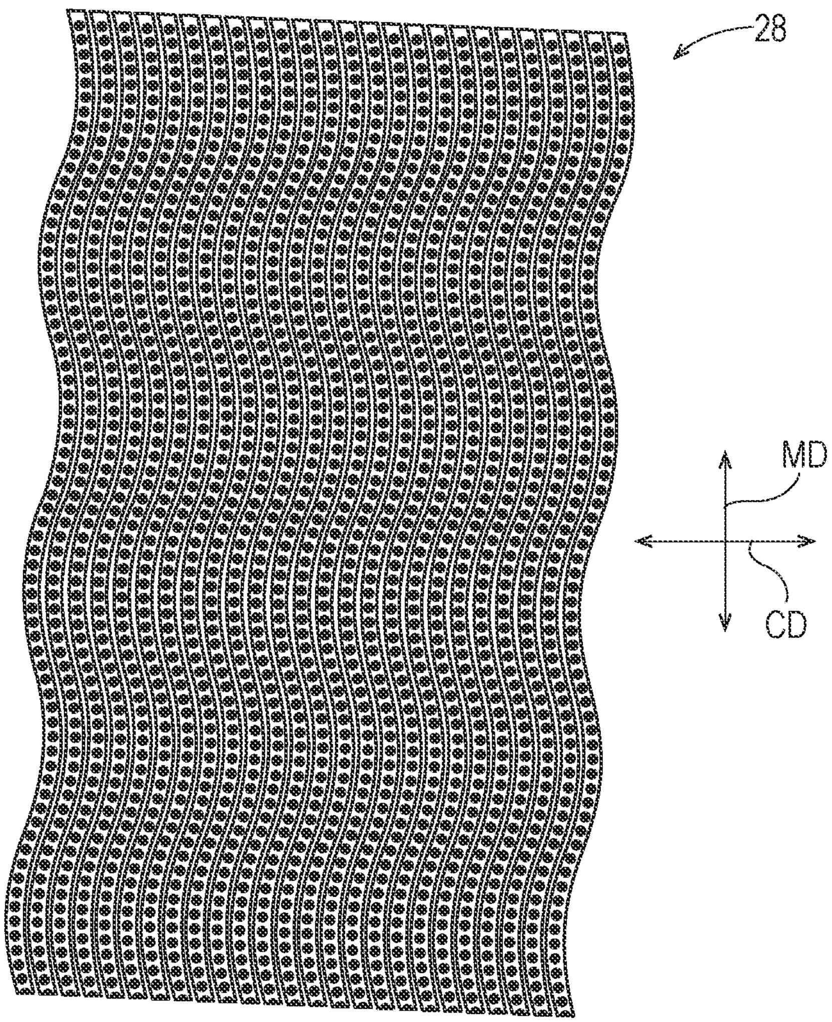
FIG. 4 is a schematic representation of an example of a mask suitable for making a molding member of the present invention.
Figure 5:
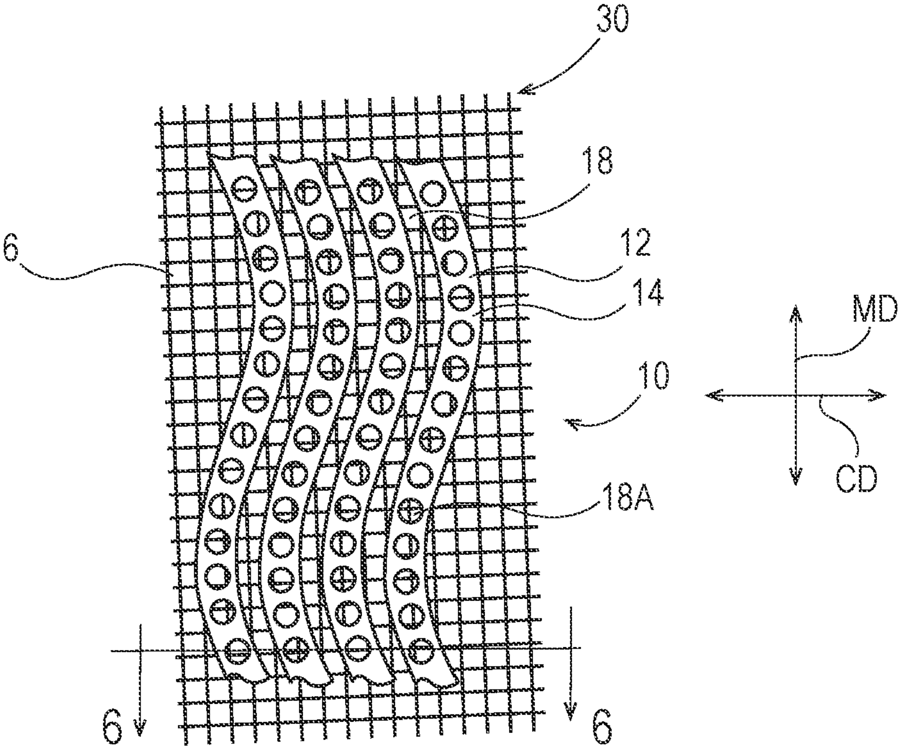
FIG. 5 is an example of a molding member suitable for making a 3D patterned fibrous structure according to the present invention.
Figure 6:
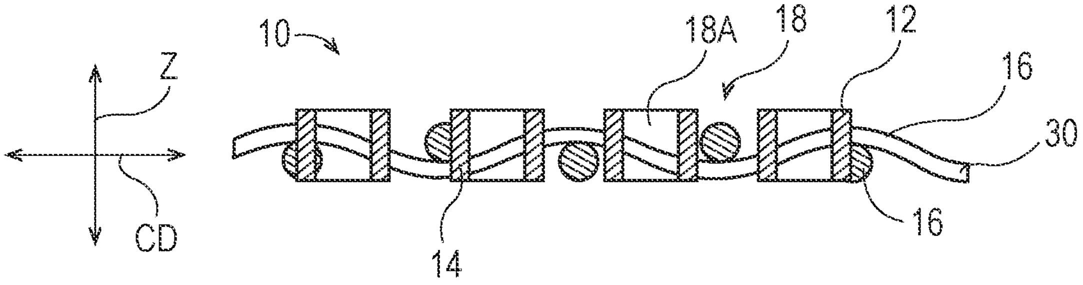
FIG. 6 is a cross-sectional view of FIG. 5 taken along line 6-6.

In one example, the reinforcing member comprises resin in the form a pattern of knuckles, for example that has been deposited onto the reinforcing member, such as by printing, extruding, spraying, dipping, brushing on, flushing, laser engraving and/or laser etching, etc. In one example as shown in FIG. 4, an example of a mask 28 used to make the molding member 30 shown in FIGS. 5 and 6. The molding member 10 comprises a reinforcing member 30 comprising filaments 16 upon which knuckles 12 formed by resin 14 are present, in this case as curvilinear lines of resin 14. Then molding member 10 further comprises pillows 18 into which at least portions of a fibrous structure may deflect during making of the fibrous structure on the molding member 10. As shown in FIGS. 5 and 6, the resin 14 comprises discrete pillows 18A that are dispersed at least through one or more of the lines of resin 14. The discrete pillows 18A, like the semi-continuous pillows 18, permit at least portions of the fibrous structure being made on the molding member 10 to deflect into the discrete pillows 18A.

In one example, a UV-curable resin is used to make the resin 14 on the molding member of the present invention by depositing a UV-curable resin onto the reinforcing member and then curing the resin 14 in a pattern dictated by a patterned mask, for example the mask 28 shown in FIG. 4, having opaque regions (black portions within the pattern), that correspond to the pillows 18 and 18A in the molding member 10 and transparent regions (white portions within the pattern), that correspond to the knuckles 12 in the molding member 10. The transparent regions permit curing radiation to penetrate to cure the resin 14 to form knuckles 12, while the opaque regions prevent the curing radiation from curing portions of the resin 14. Once curing is achieved, the uncured resin is washed away to leave a pattern of cured resin 14 that is substantially identical to the pattern of the mask 28. The cured portions are the knuckles 12 of the molding member 10, and the uncured portions are the pillows 18 and 18A of the molding member 10. The pattern of knuckles 12 and pillows 18 and 18A can be designed as desired, and the present invention is an improvement in which the pattern of knuckles 12 and pillows 18 and 18A disclosed herein delivers a unique molding member 10 (papermaking belt) that in turn produces fibrous structures and/or sanitary tissue products having superior technical properties compared to prior art fibrous structures and/or sanitary tissue products.

Each knuckle 12 on a molding member 10 forms a non-pillow region 24, for example a knuckle region, in a fibrous structure 22, which can be a relatively high density region or a region of different basis weight relative to the s pillow region 26.

Thus, the mask pattern is replicated in the molding member, which pattern is essentially replicated in the fibrous structure which can be molded onto the molding member when making a fibrous structure. Therefore, in describing the pattern of non-pillow regions 24, for example knuckle regions such as semi-continuous knuckle regions, and pillow regions 26, for example semi-continuous knuckle regions 26B and/or discrete pillow regions 26A in the fibrous structure of the invention, the pattern of the mask can serve as a proxy, and in the description below a visual description of the mask may be provided, and one is to understand that the dimensions and appearance of the mask is essentially identical to the dimensions and appearance of the molding member made using the mask, and the fibrous structure made on the molding member. Further, in processes that use a molding member not made from a mask, the appearance and structure of the molding member in the same way is imparted to the fibrous structure, such that the dimensions of features on the molding member can also be measured and characterized as a proxy for the dimensions and characteristics of the fibrous structure.

In one example, the fibrous structures of the present invention made by molding members formed using masks may exhibit the inverse in properties, such as density and basis weight depending upon what parts of the mask are opaque and what parts are transparent and/or whether the fibrous structure is made by a Yankeeless process or a Yankee process.

Figure 7:
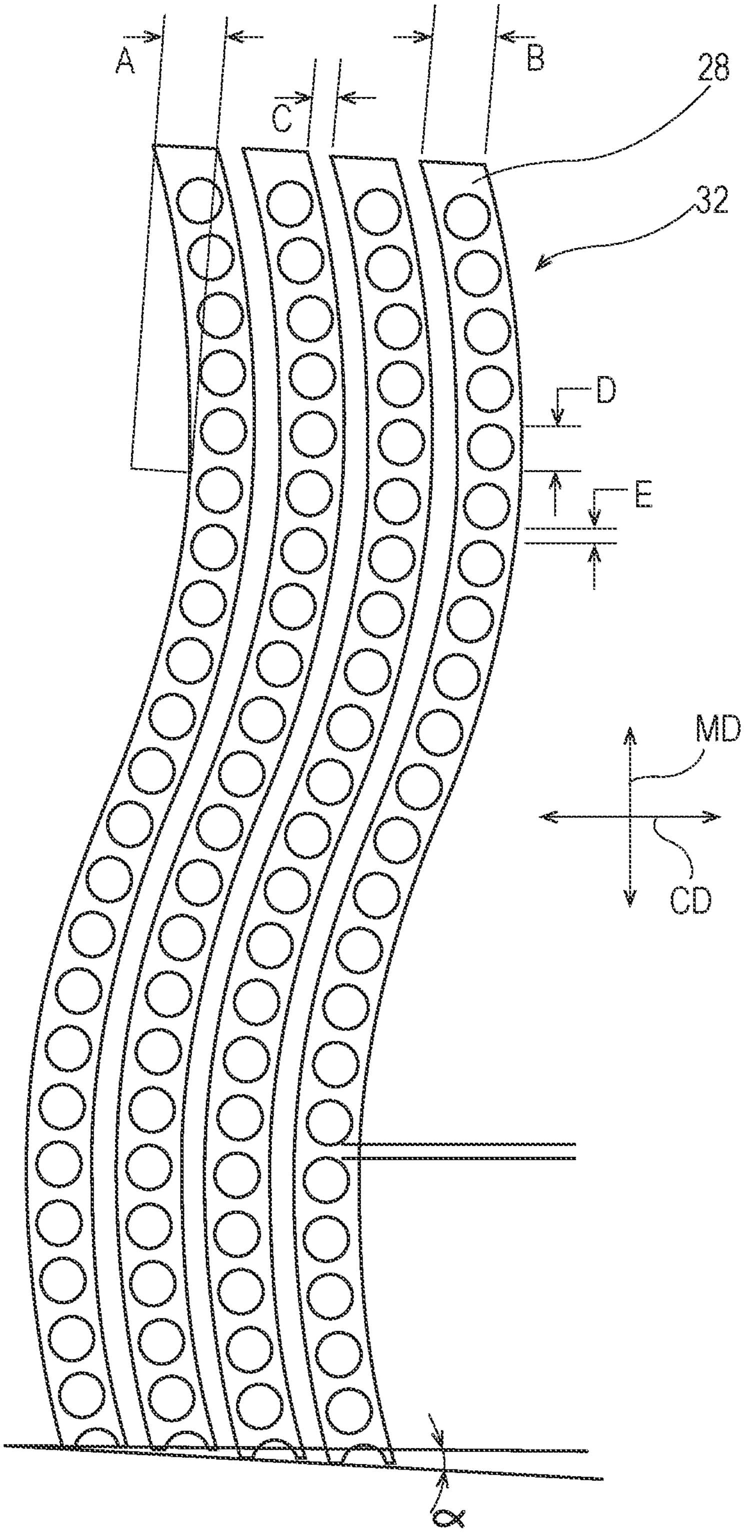
FIG. 7 is a schematic representation of an example of a mask suitable for making a molding member of the present invention.

In one example as shown in FIG. 7, an example of a repeat unit 32 of a pattern of a mask 28 used to make a molding member 10 having the pattern of knuckles corresponding to a mask that made a fibrous structure 22 like the one shown in FIGS. 2 and 3. Again, as discussed above, the fibrous structure 22 exhibits a pattern of non-pillow regions 24, for example knuckle regions, which were formed by resin knuckles 12 on the molding member 10, and which correspond to the transparent (white) areas of the mask 28 shown in FIG. 4.

Even though the discussion herein relates to masks 28 used to make molding members 10 of the present invention, the discussion is applicable to molding member 10 that are not made using a mask 28 such as molding members 10 that have resin printed, extruded, dripped, brushed, sprayed, etc. onto a reinforcing member 30 and even to a molding member 10 made by other means, such as by additive manufacturing so long as the resulting fibrous structure 22 exhibits a Total Pillow Perimeter value of at least 30 in/in$^2$ as measured according to the Total Pillow Perimeter Test Method and a Surface Void Volume value at 1.7 psi of at least 0.090 mm$^3$/mm$^2$ and/or a Surface Void Volume value at 0.88 psi of at least 0.108 mm$^3$/mm$^2$ as measured according to the Surface Void Volume Test Method.

The molding member 10 as shown in FIGS. 5 and 6 and the corresponding masks 28, for example as shown in FIGS. 4 and 7, produce a fibrous structure 22 as shown in FIG. 3, having a plurality of semi-continuous non-pillow regions 24, for example semi-continuous curvilinear knuckle regions, separated by adjacent semi-continuous pillow regions 26, for example semi-continuous curvilinear pillow regions, in a generally parallel configuration with the width and spacing of the non-pillow regions 24 and pillow regions 26 being as determined for desired properties of a fibrous structure 22. In addition to the semi-continuous pillow regions 26B, an example of the present invention also includes discrete pillow regions 26A formed within the semi-continuous knuckle regions. Discrete pillows 18A and/or discrete pillow regions 26A imparted to fibrous structures 22 by discrete pillows 18A on molding members 10 may be any shape desired and as more fully shown below, but in an example can be circular and spaced in a uniform manner along the length of a given knuckle 12 and/or non-pillow region 24 imparted to fibrous structures 22 by knuckles 12.

The dimensions of a mask and/or molding member of the present invention, and therefore the resulting fibrous structure made using the mask and/or molding member can range according to desired characteristics of the desired paper properties. Using mask 28 and specifically its repeat unit 32 as described in FIG. 7 for a non-limiting description, the curvilinear aspect can be described as a wave-form having an amplitude A of from about 1.778 mm to about 4.826 mm and can be about 2.286 mm. The width B of semi-continuous knuckles can be uniform and can be from about 1.778 mm to about 2.794 mm and can be about 2.515 mm. The width C of semi-continuous pillows can be uniform and can be from about 0.762 mm to about 2.032 mm and can be about 1.016 mm. The diameter D of discrete pillows, if generally circular shaped, can be from about 0.254 mm to about 3.81 mm and/or from about 0.508 mm to about 3.048 mm and/or from about 0.762 mm to about 2.54 mm and/or from about 1.27 mm to about 2.286 mm and can be about 1.791 mm. The spacing E between discrete pillows can be uniform and can be from about 0.254 mm to about 1.016 mm and can be about 0.4648 mm. The entire pattern can be rotated an angle off of the Machine Direction, MD, by an angle $\alpha$ which can be about 2-5 degrees, and can be about 3 degrees.

Figure 8:
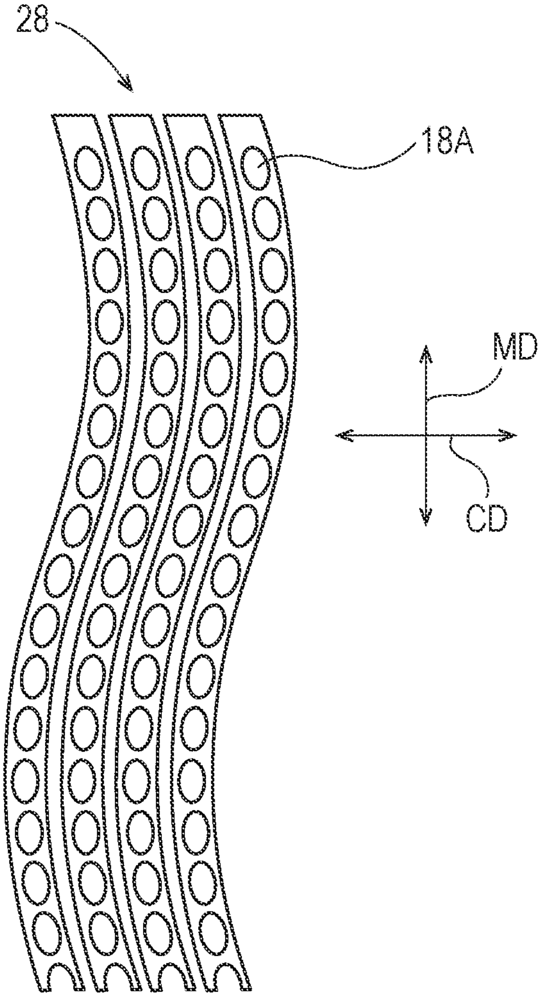
FIG. 8 is a schematic representation of another example of a mask suitable for making a molding member of the present invention.

Discrete pillows 18A of the molding members 10 and thus in discrete pillow regions 26A the fibrous structures 22 can have various shapes, within a pattern and/or between different patterns, including any shape of a two-dimensional closed figure, with non-limiting examples shown in FIGS. 8-12. In FIG. 8, a mask 28 is shown for making oval and/or elliptical discrete pillows 18A that can have a long dimension, for example being between about 1.27 mm and about 2.54 mm and can be about 2.286 mm, and a short dimension of between about 0.889 mm and about 1.651 mm and can be about 1.397 mm. The spacing between elliptical discrete pillows 18A can be from about 0.508 mm and about 1.016 mm and can be about 0.762 mm.

Figure 9:
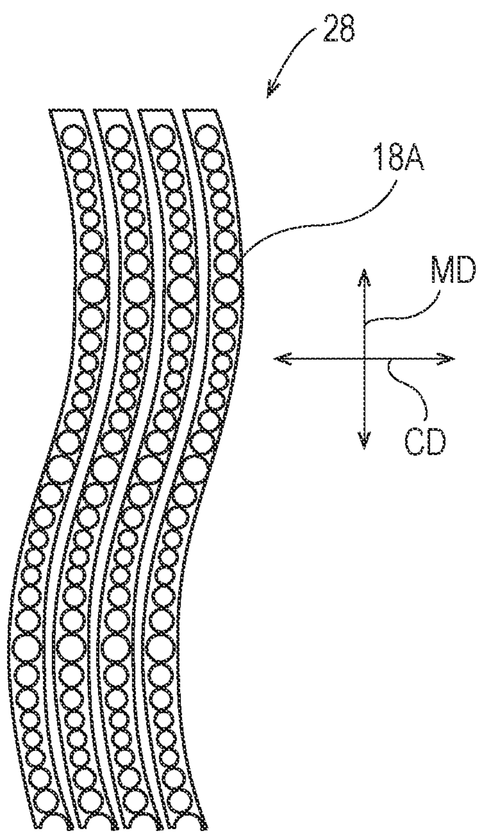
FIG. 9 is a schematic representation of another example of a mask suitable for making a molding member of the present invention.

FIG. 9 shows a mask 28 for making discrete pillows 18A that are variable in size, in the illustrated case, diameter of a circular shape. In the illustrated example, five different diameter pillows vary in diameter from about 0.762 mm to about 1.778 mm and are generally regularly spaced along semi-continuous knuckle 12.

Figure 10:
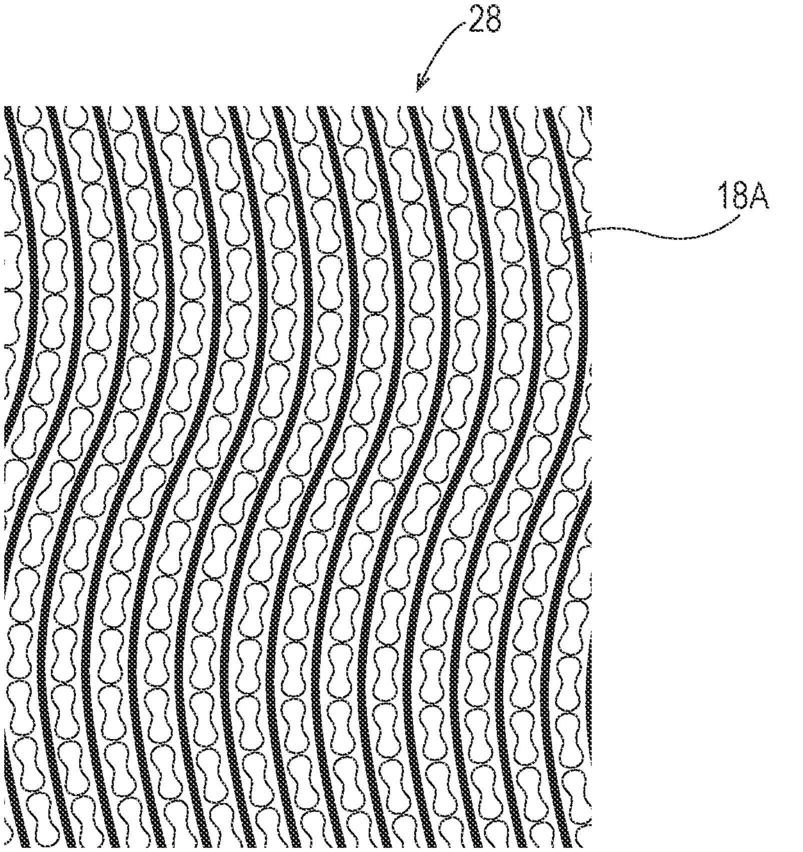
FIG. 10 is a schematic representation of another example of a mask suitable for making a molding member of the present invention.

FIG. 10 shows an example of a mask 28 in which the discrete pillows 18A are in the shape of a dogbone. The dogbone shaped discrete pillows 18A are a non-limiting example of a relatively complex shape that discrete pillows 18A can take.

Figure 11:
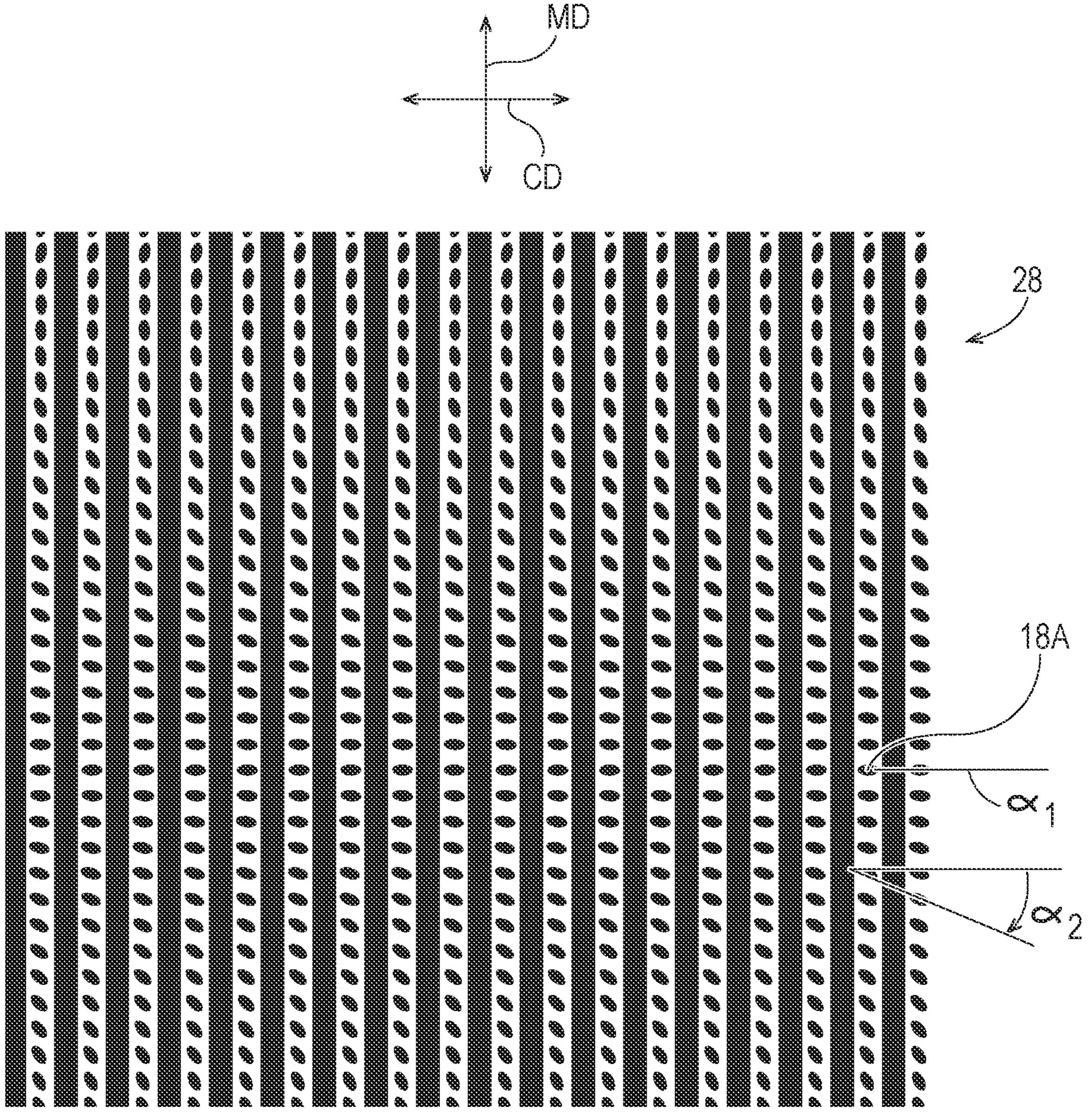
FIG. 11 is a schematic representation of another example of a mask suitable for making a molding member of the present invention.

FIG. 11 shows an example of a mask 28 where the semi-continuous knuckles 12 are generally straight and parallel, and in which the portions corresponding to the discrete pillows 18A are in the shape of ellipses, and, as well, the major axis of each ellipse is rotated from the CD-direction in a varying amount as the series of ellipses progress in the MD, as illustrated by $\alpha_1$ and $\alpha_2$. In the illustrated embodiment, the rotation from one ellipse to the next is about 5 degrees. It is believed that such rotation of discrete pillows contributes to improved visual appearance of a fibrous structure made thereon.

Figure 12:
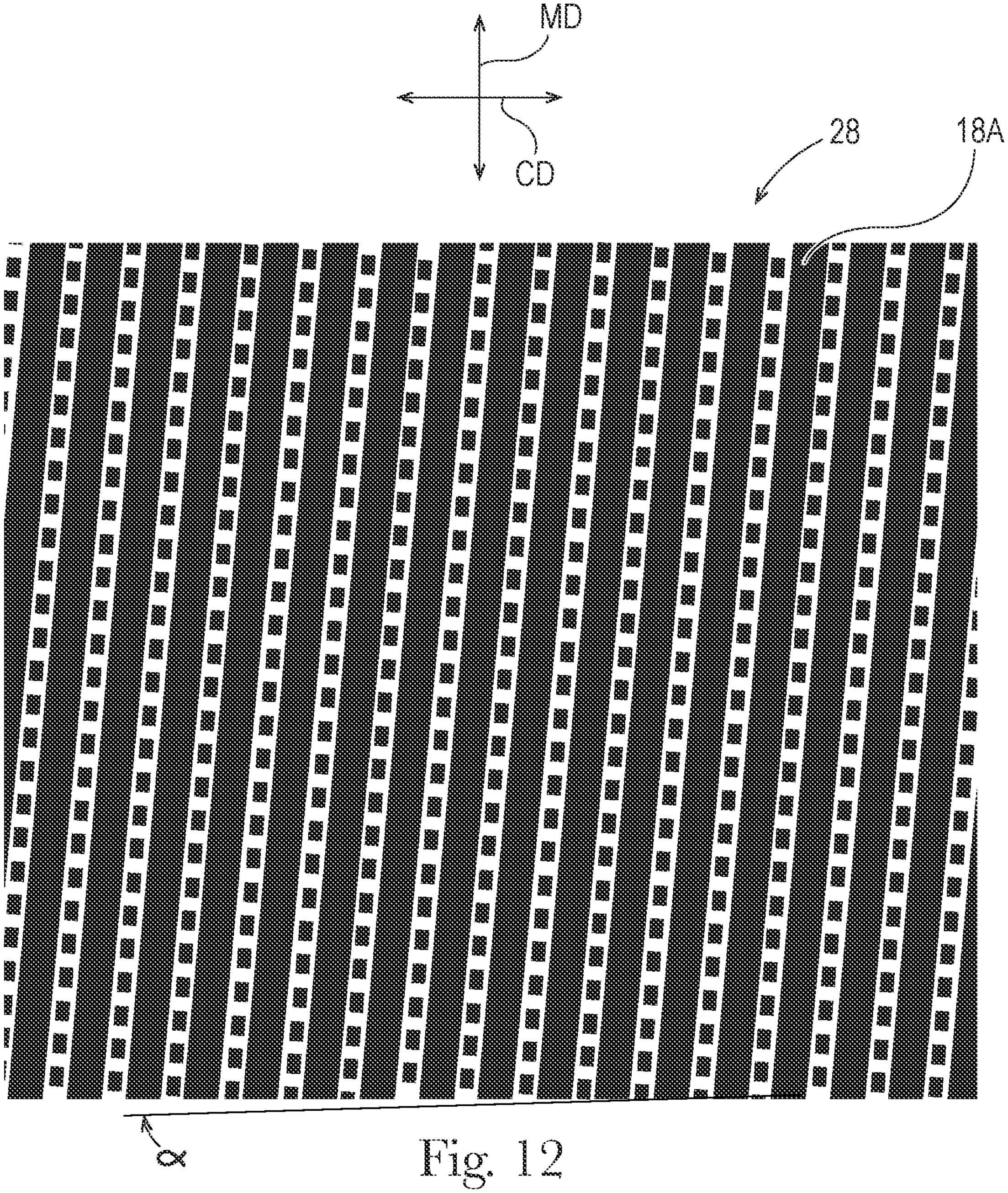
FIG. 12 is a schematic representation of another example of a mask suitable for making a molding member of the present invention.

FIG. 12 shows an example of a mask 28 in which the portions corresponding to discrete pillows 18A are in the shape of rectangles, and, as well, the pattern is oriented at an angle $\alpha$ off of the MD-CD orientation.

Figure 13:
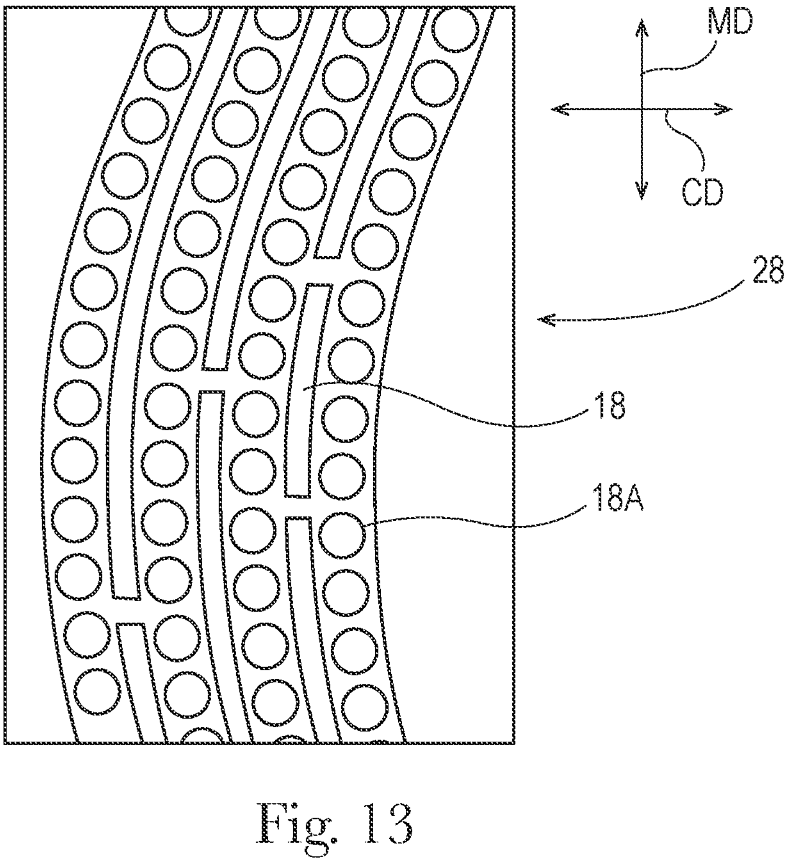
FIG. 13 is a schematic representation of another example of a mask suitable for making a molding member of the present invention.

FIG. 13 shows an example of a mask 28 in which at least a portion of the pillow 18 is interrupted with a portion of a knuckle. In other words, at least one or more semi-continuous pillows 18 is broken into segments and thus is not semi-continuous. In another example a mask (not shown), one or more knuckles may be interrupted with a portion of a pillow.

In even another example, a mask 28 and/or molding member 10 may comprise one or more knuckles that are void of discrete pillows and one or more knuckles that comprise one or more discrete pillows.

Descriptions herein of the knuckles and pillows of the masks 28 and/or the molding members 10 are applicable to both masks 28 and molding members 10.

In one example, the molding members 10 of the present invention may comprise from about 20-50% and/or from about 30-45% and/or from about 35-45% knuckle area and from about 50-80% and/or from about 55-70% and/or from about 55-65% pillow area.

As discussed above, the fibrous structure can be embossed during a converting operation to produce the embossed fibrous structures of the present disclosure.

Methods for Making Fibrous Structures

The fibrous structures of the present invention may be made by any suitable papermaking process so long as a molding member of the present invention is used to making the sanitary tissue product or at least one fibrous structure ply of the sanitary tissue product and that the sanitary tissue product exhibits a compressibility and plate stiffness values of the present invention. The method may be a sanitary tissue product making process that uses a cylindrical dryer such as a Yankee (a Yankee-process) or it may be a Yankeeless process as is used to make substantially uniform density and/or uncreped fibrous structures and/or sanitary tissue products. Alternatively, the fibrous structures and/or sanitary tissue products may be made by an air-laid process and/or meltblown and/or spunbond processes and any combinations thereof so long as the fibrous structures and/or sanitary tissue products of the present invention are made thereby.

In an example of a method for making fibrous structures of the present disclosure, the method can comprise the steps of:

(a) providing a fibrous furnish comprising fibers; and (b) depositing the fibrous furnish onto a molding member such that at least one fiber is deflected out-of-plane of the other fibers present on the molding member.

In still another example of a method for making a fibrous structure of the present disclosure, the method comprises the steps of:

(a) providing a fibrous furnish comprising fibers;

(b) depositing the fibrous furnish onto a foraminous member to form an embryonic fibrous web;

(c) associating the embryonic fibrous web with a papermaking belt having a pattern of knuckles as disclosed herein such that at a portion of the fibers are deflected out-of-plane of the other fibers present in the embryonic fibrous web; and (d) drying said embryonic fibrous web such that that the dried fibrous structure is formed.

In another example of a method for making the fibrous structures of the present disclosure, the method can comprise the steps of:

(a) providing a fibrous furnish comprising fibers;

(b) depositing the fibrous furnish onto a foraminous member such that an embryonic fibrous web is formed;

(c) associating the embryonic web with a papermaking belt having a pattern of knuckles as disclosed herein such that at a portion of the fibers can be formed in the substantially continuous deflection conduits;

(d) deflecting a portion of the fibers in the embryonic fibrous web into the substantially continuous deflection conduits and removing water from the embryonic web so as to form an intermediate fibrous web under such conditions that the deflection of fibers is initiated no later than the time at which the water removal through the discrete deflection cells or the substantially continuous deflection conduits is initiated; and (e) optionally, drying the intermediate fibrous web; and (f) optionally, foreshortening the intermediate fibrous web, such as by creping.

Figure 14:
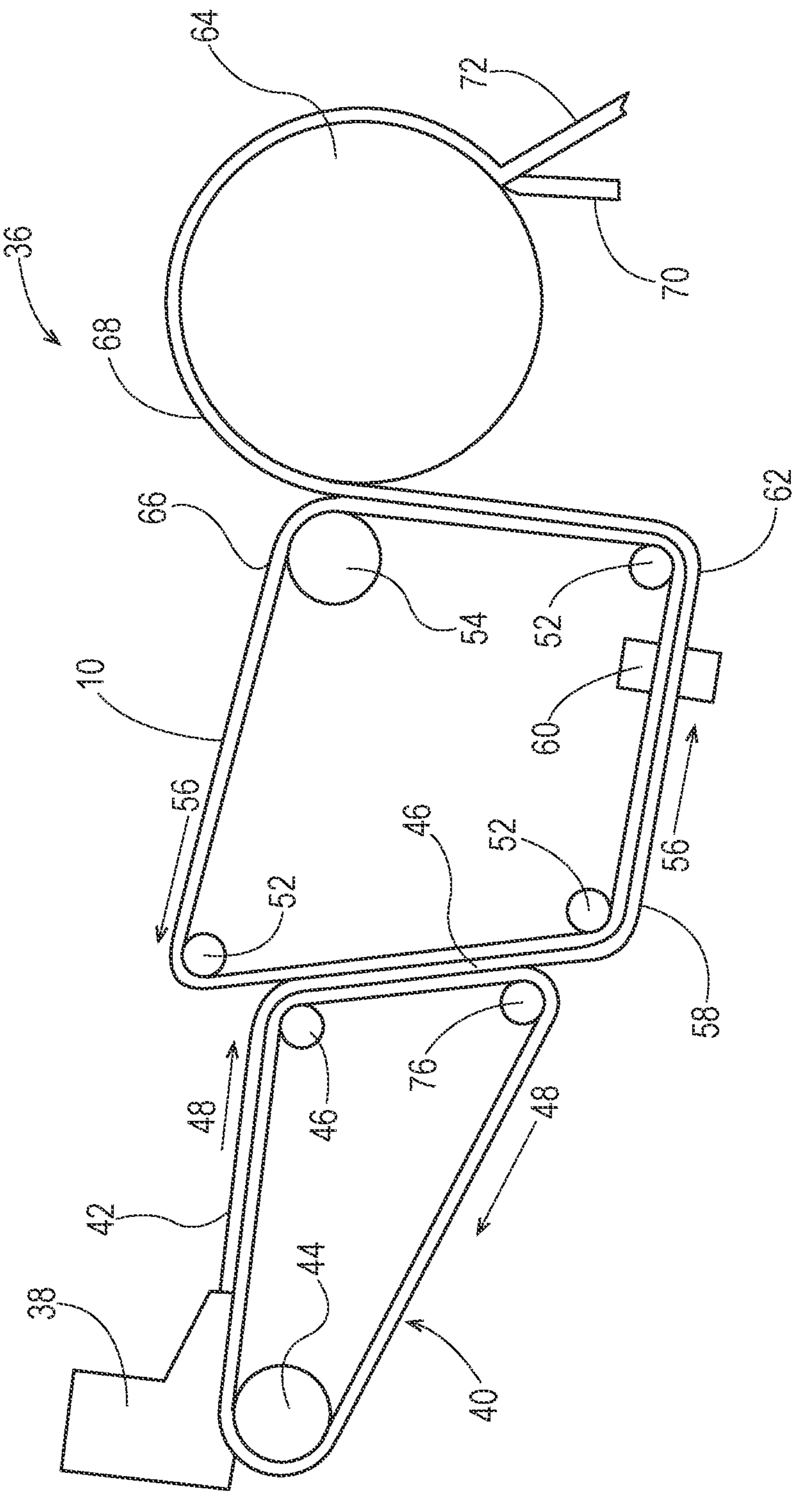
FIG. 14 is a schematic representation of an example of a through-air-drying papermaking process for making a sanitary tissue product according to the present invention.

As shown in FIG. 14, one example of a process and equipment, represented as 36 for making a sanitary tissue product according to the present invention comprises supplying an aqueous dispersion of fibers (a fibrous furnish or fiber slurry) to a headbox 38 which can be of any convenient design. From headbox 38 the aqueous dispersion of fibers is delivered to a first foraminous member 40 which is typically a Fourdrinier wire, to produce an embryonic fibrous structure 42.

The first foraminous member 40 may be supported by a breast roll 44 and a plurality of return rolls 46 of which only two are shown. The first foraminous member 40 can be propelled in the direction indicated by directional arrow 48 by a drive means, not shown. Optional auxiliary units and/or devices commonly associated fibrous structure making machines and with the first foraminous member 40, but not shown, include forming boards, hydrofoils, vacuum boxes, tension rolls, support rolls, wire cleaning showers, and the like.

After the aqueous dispersion of fibers is deposited onto the first foraminous member 40, embryonic fibrous structure 42 is formed, typically by the removal of a portion of the aqueous dispersing medium by techniques well known to those skilled in the art. Vacuum boxes, forming boards, hydrofoils, and the like are useful in effecting water removal. The embryonic fibrous structure 42 may travel with the first foraminous member 40 about return roll 46 and is brought into contact with a patterned molding member 10 according to the present invention, such as a 3D patterned through-air-drying belt. While in contact with the patterned molding member 10, the embryonic fibrous structure 42 will be deflected, rearranged, and/or further dewatered.

The patterned molding member 10 may be in the form of an endless belt. In this simplified representation, the patterned molding member 10 passes around and about patterned molding member return rolls 52 and impression nip roll 54 and may travel in the direction indicated by directional arrow 56. Associated with patterned molding member 10, but not shown, may be various support rolls, other return rolls, cleaning means, drive means, and the like well known to those skilled in the art that may be commonly used in fibrous structure making machines.

After the embryonic fibrous structure 42 has been associated with the patterned molding member 10, fibers within the embryonic fibrous structure 42 are deflected into pillows and/or pillow network ("deflection conduits") present in the patterned molding member 10. In one example of this process step, there is essentially no water removal from the embryonic fibrous structure 42 through the deflection conduits after the embryonic fibrous structure 42 has been associated with the patterned molding member 10 but prior to the deflecting of the fibers into the deflection conduits. Further water removal from the embryonic fibrous structure 42 can occur during and/or after the time the fibers are being deflected into the deflection conduits. Water removal from the embryonic fibrous structure 42 may continue until the consistency of the embryonic fibrous structure 42 associated with patterned molding member 10 is increased to from about 25% to about 35%. Once this consistency of the embryonic fibrous structure 42 is achieved, then the embryonic fibrous structure 42 can be referred to as an intermediate fibrous structure 58. During the process of forming the embryonic fibrous structure 42, sufficient water may be removed, such as by a noncompressive process, from the embryonic fibrous structure 42 before it becomes associated with the patterned molding member 10 so that the consistency of the embryonic fibrous structure 42 may be from about 10% to about 30%.

While applicants decline to be bound by any particular theory of operation, it appears that the deflection of the fibers in the embryonic fibrous structure and water removal from the embryonic fibrous structure begin essentially simultaneously. Embodiments can, however, be envisioned wherein deflection and water removal are sequential operations. Under the influence of the applied differential fluid pressure, for example, the fibers may be deflected into the deflection conduit with an attendant rearrangement of the fibers. Water removal may occur with a continued rearrangement of fibers. Deflection of the fibers, and of the embryonic fibrous structure, may cause an apparent increase in surface area of the embryonic fibrous structure. Further, the rearrangement of fibers may appear to cause a rearrangement in the spaces or capillaries existing between and/or among fibers.

It is believed that the rearrangement of the fibers can take one of two modes dependent on a number of factors such as, for example, fiber length. The free ends of longer fibers can be merely bent in the space defined by the deflection conduit while the opposite ends are restrained in the region of the ridges. Shorter fibers, on the other hand, can actually be transported from the region of the ridges into the deflection conduit (The fibers in the deflection conduits will also be rearranged relative to one another). Naturally, it is possible for both modes of rearrangement to occur simultaneously.

As noted, water removal occurs both during and after deflection; this water removal may result in a decrease in fiber mobility in the embryonic fibrous structure. This decrease in fiber mobility may tend to fix and/or freeze the fibers in place after they have been deflected and rearranged. Of course, the drying of the fibrous structure in a later step in the process of this invention serves to more firmly fix and/or freeze the fibers in position.

Any convenient means conventionally known in the papermaking art can be used to dry the intermediate fibrous structure 58. Examples of such suitable drying process include subjecting the intermediate fibrous structure 58 to conventional and/or flow-through dryers and/or Yankee dryers.

In one example of a drying process, the intermediate fibrous structure 58 in association with the patterned molding member 10 passes around the patterned molding member return roll 52 and travels in the direction indicated by directional arrow 56. The intermediate fibrous structure 58 may first pass through an optional predryer 60. This predryer 60 can be a conventional flow-through dryer (hot air dryer) well known to those skilled in the art. Optionally, the predryer 60 can be a so-called capillary dewatering apparatus. In such an apparatus, the intermediate fibrous structure 58 passes over a sector of a cylinder having preferential-capillary-size pores through its cylindrical-shaped porous cover. Optionally, the predryer 60 can be a combination capillary dewatering apparatus and flow-through dryer. The quantity of water removed in the predryer 60 may be controlled so that a predried fibrous structure 62 exiting the predryer 60 has a consistency of from about 30% to about 98%. The predried fibrous structure 62, which may still be associated with patterned molding member 10, may pass around another patterned molding member return roll 52 and as it travels to an impression nip roll 54. As the predried fibrous structure 62 passes through the nip formed between impression nip roll 54 and a surface of a Yankee dryer 64, the pattern formed by the top surface 66 of patterned molding member 10 is impressed into the predried fibrous structure 62 to form a 3D patterned fibrous structure 68. The imprinted fibrous structure 68 can then be adhered to the surface of the Yankee dryer 64 where it can be dried to a consistency of at least about 95%.

The 3D patterned fibrous structure 68 can then be foreshortened by creping the 3D patterned fibrous structure 68 with a creping blade 70 to remove the 3D patterned fibrous structure 68 from the surface of the Yankee dryer 64 resulting in the production of a 3D patterned creped fibrous structure 72 in accordance with the present invention. As used herein, foreshortening refers to the reduction in length of a dry (having a consistency of at least about 90% and/or at least about 95%) fibrous structure which occurs when energy is applied to the dry fibrous structure in such a way that the length of the fibrous structure is reduced and the fibers in the fibrous structure are rearranged with an accompanying disruption of fiber-fiber bonds. Foreshortening can be accomplished in any of several well-known ways. One common method of foreshortening is creping. The 3D patterned creped fibrous structure 72 may be subjected to post processing steps such as calendaring, tuft generating operations, and/or embossing and/or converting.

Figure 15:
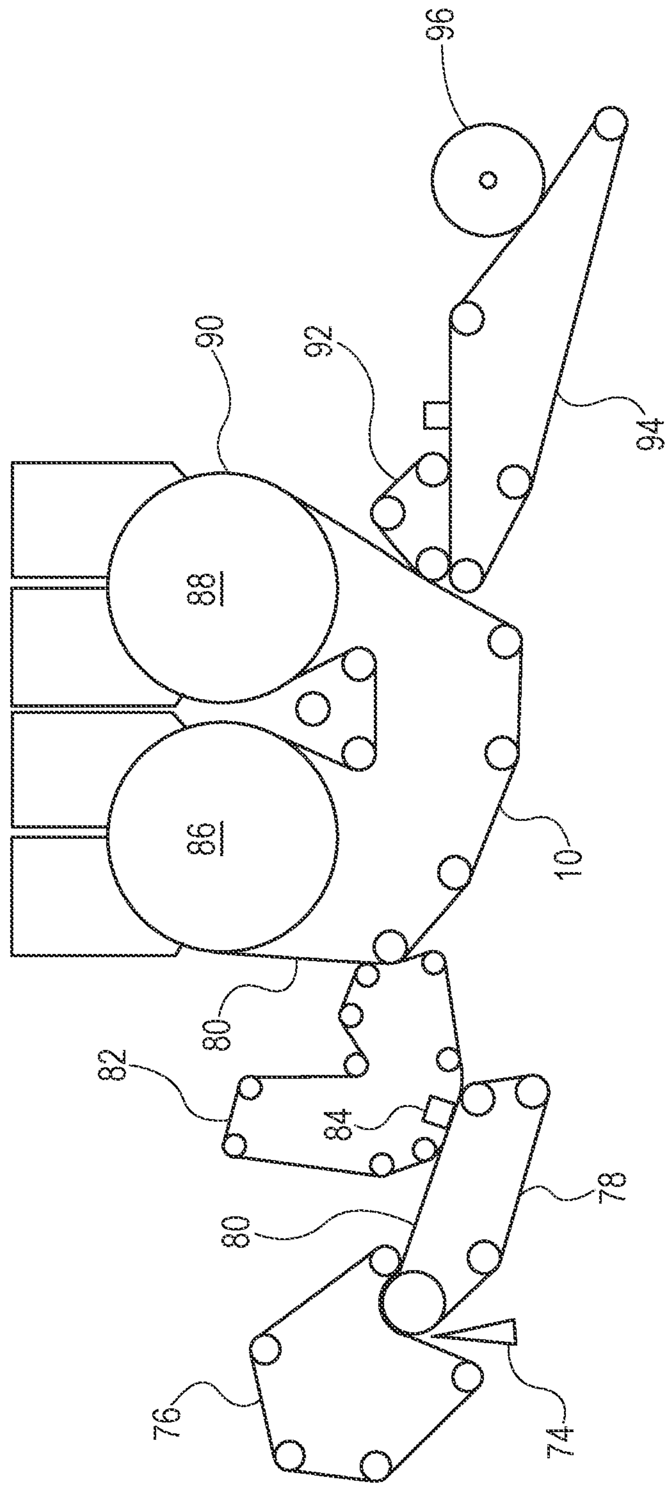
FIG. 15 is a schematic representation of an example of an uncreped through-air-drying papermaking process for making a sanitary tissue product according to the present invention.

Another example of a suitable papermaking process for making the fibrous structures of the present invention is illustrated in FIG. 15. FIG. 15 illustrates an uncreped through-air-drying process. In this example, a multi-layered headbox 74 deposits an aqueous suspension of papermaking fibers between forming wires 76 and 78 to form an embryonic fibrous structure 80.

The embryonic fibrous structure 80 is transferred to a slower moving transfer fabric 82 with the aid of at least one vacuum box 84. The level of vacuum used for the fibrous structure transfers can be from about 3 to about 15 inches of mercury (76 to about 381 millimeters of mercury). The vacuum box 84 (negative pressure) can be supplemented or replaced by the use of positive pressure from the opposite side of the embryonic fibrous structure 80 to blow the embryonic fibrous structure 80 onto the next fabric in addition to or as a replacement for sucking it onto the next fabric with vacuum. Also, a vacuum roll or rolls can be used to replace the vacuum box(es) 84.

The embryonic fibrous structure 80 is then transferred to a molding member 10 according to the present invention, such as a through-air-drying fabric, and passed over through-air-dryers 86 and 88 to dry the embryonic fibrous structure 80 to form a 3D patterned fibrous structure 90. While supported by the molding member 10, the 3D patterned fibrous structure 90 is finally dried to a consistency of about 94% percent or greater. After drying, the 3D patterned fibrous structure 90 is transferred from the molding member 10 to fabric 92 and thereafter briefly sandwiched between fabrics 92 and 94. The dried 3D patterned fibrous structure 90 remains with fabric 94 until it is wound up at the reel 96 ("parent roll") as a finished fibrous structure. Thereafter, the finished 3D patterned fibrous structure 90 can be unwound, calendered and converted into the sanitary tissue product of the present invention, such as a roll of bath tissue, in any suitable manner.

Figure 16:
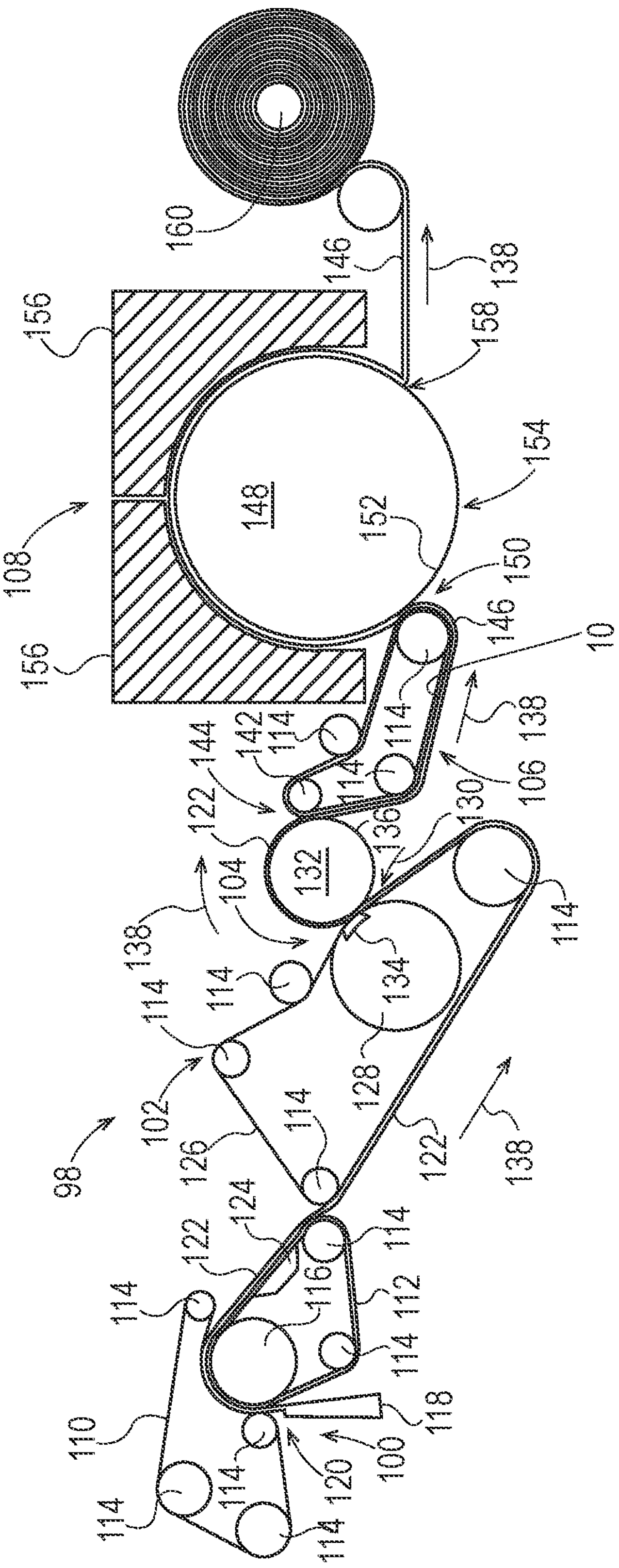
FIG. 16 is a schematic representation of an example of fabric creped papermaking process for making a sanitary tissue product according to the present invention.

Yet another example of a suitable papermaking process for making the fibrous structures of the present invention is illustrated in FIG. 16. FIG. 16 illustrates a papermaking machine 98 having a conventional twin wire forming section 100, a felt run section 102, a shoe press section 104, a molding member section 106, in this case a creping fabric section, and a Yankee dryer section 108 suitable for practicing the present invention. Forming section 100 includes a pair of forming fabrics 110 and 112 supported by a plurality of rolls 114 and a forming roll 116. A headbox 118 provides papermaking furnish to a nip 120 between forming roll 116 and roll 114 and the fabrics 110 and 112. The furnish forms an embryonic fibrous structure 122 which is dewatered on the fabrics 110 and 112 with the assistance of vacuum, for example, by way of vacuum box 124.

The embryonic fibrous structure 122 is advanced to a papermaking felt 126 which is supported by a plurality of rolls 114 and the felt 126 is in contact with a shoe press roll 128. The embryonic fibrous structure 122 is of low consistency as it is transferred to the felt 126. Transfer may be assisted by vacuum; such as by a vacuum roll if so desired or a pickup or vacuum shoe as is known in the art. As the embryonic fibrous structure 122 reaches the shoe press roll 128 it may have a consistency of 10-25% as it enters the shoe press nip 130 between shoe press roll 128 and transfer roll 132. Transfer roll 132 may be a heated roll if so desired. Instead of a shoe press roll 128, it could be a conventional suction pressure roll. If a shoe press roll 128 is employed it is desirable that roll 114 immediately prior to the shoe press roll 128 is a vacuum roll effective to remove water from the felt 126 prior to the felt 126 entering the shoe press nip 130 since water from the furnish will be pressed into the felt 126 in the shoe press nip 130. In any case, using a vacuum roll at the roll 114 is typically desirable to ensure the embryonic fibrous structure 122 remains in contact with the felt 126 during the direction change as one of skill in the art will appreciate from the diagram.

The embryonic fibrous structure 122 is wet-pressed on the felt 126 in the shoe press nip 130 with the assistance of pressure shoe 134. The embryonic fibrous structure 122 is thus compactively dewatered at the shoe press nip 130, typically by increasing the consistency by 15 or more points at this stage of the process. The configuration shown at shoe press nip 130 is generally termed a shoe press; in connection with the present invention transfer roll 132 is operative as a transfer cylinder which operates to convey embryonic fibrous structure 122 at high speed, typically 1000 feet/minute (fpm) to 6000 fpm to the patterned molding member section 106 of the present invention, for example a creping fabric section.

Transfer roll 132 has a smooth transfer roll surface 136 which may be provided with adhesive and/or release agents if needed. Embryonic fibrous structure 122 is adhered to transfer roll surface 136 which is rotating at a high angular velocity as the embryonic fibrous structure 122 continues to advance in the machine-direction indicated by arrows 138. On the transfer roll 132, embryonic fibrous structure 122 has a generally random apparent distribution of fiber.

Embryonic fibrous structure 122 enters shoe press nip 130 typically at consistencies of 10-25% and is dewatered and dried to consistencies of from about 25 to about 70% by the time it is transferred to the molding member 10 according to the present invention, which in this case is a patterned creping fabric, as shown in the diagram.

Molding member 10 is supported on a plurality of rolls 114 and a press nip roll 142 and forms a molding member nip 144, for example fabric crepe nip, with transfer roll 132 as shown.

The molding member 10 defines a creping nip over the distance in which molding member is adapted to contact transfer roll 132; that is, applies significant pressure to the embryonic fibrous structure 122 against the transfer roll 132. To this end, backing (or creping) press nip roll 142 may be provided with a soft deformable surface which will increase the length of the creping nip and increase the fabric creping angle between the molding member 10 and the embryonic fibrous structure 122 and the point of contact or a shoe press roll could be used as press nip roll 142 to increase effective contact with the embryonic fibrous structure 122 in high impact molding member nip 144 where embryonic fibrous structure 122 is transferred to molding member 10 and advanced in the machine-direction 138. By using different equipment at the molding member nip 144, it is possible to adjust the fabric creping angle or the takeaway angle from the molding member nip 144. Thus, it is possible to influence the nature and amount of redistribution of fiber, delamination/debonding which may occur at molding member nip 144 by adjusting these nip parameters. In some embodiments it may by desirable to restructure the z-direction interfiber characteristics while in other cases it may be desired to influence properties only in the plane of the fibrous structure. The molding member nip parameters can influence the distribution of fiber in the fibrous structure in a variety of directions, including inducing changes in the z-direction as well as the MD and CD. In any case, the transfer from the transfer roll to the molding member is high impact in that the fabric is traveling slower than the fibrous structure and a significant velocity change occurs. Typically, the fibrous structure is creped anywhere from 10-60% and even higher during transfer from the transfer roll to the molding member.

Molding member nip 144 generally extends over a molding member nip distance of anywhere from about ⅛" to about 2", typically ½" to 2". For a molding member 10 according to the present invention, for example creping fabric (fabric creping belt), with 32 CD strands per inch, embryonic fibrous structure 122 thus will encounter anywhere from about 4 to 64 weft filaments in the molding member nip 144.

The nip pressure in molding member nip 144, that is, the loading between roll 142 and transfer roll 132 is suitably 20-100 pounds per linear inch (PLI).

After passing through the molding member nip 144, and for example fabric creping the embryonic fibrous structure 122, a 3D patterned fibrous structure 146 continues to advance along MD 138 where it is wet-pressed onto Yankee cylinder (dryer) 148 in transfer nip 150. Transfer at nip 150 occurs at a 3D patterned fibrous structure 146 consistency of generally from about 25 to about 70%. At these consistencies, it is difficult to adhere the 3D patterned fibrous structure 146 to the Yankee cylinder surface 152 firmly enough to remove the 3D patterned fibrous structure 146 from the molding member 10 thoroughly. This aspect of the process is important, particularly when it is desired to use a high velocity drying hood as well as maintain high impact creping conditions.

In this connection, it is noted that conventional TAD processes do not employ high velocity hoods since sufficient adhesion to the Yankee dryer is not achieved.

It has been found in accordance with the present invention that the use of particular adhesives cooperate with a moderately moist fibrous structure (25-70% consistency) to adhere it to the Yankee dryer sufficiently to allow for high velocity operation of the system and high jet velocity impingement air drying. In this connection, a poly(vinyl alcohol)/polyamide adhesive composition as noted above is applied at 154 as needed.

The 3D patterned fibrous structure is dried on Yankee cylinder 148 which is a heated cylinder and by high jet velocity impingement air in Yankee hood 156. As the Yankee cylinder 148 rotates, 3D patterned fibrous structure 146 is creped from the Yankee cylinder 148 by creping doctor blade 158 and wound on a take-up roll 160. Creping of the paper from a Yankee dryer may be carried out using an undulatory creping blade, such as that disclosed in U.S. Pat. No. 5,690,788, the disclosure of which is incorporated by reference. Use of the undulatory crepe blade has been shown to impart several advantages when used in production of tissue products. In general, tissue products creped using an undulatory blade have higher caliper (thickness), increased CD stretch, and a higher void volume than do comparable tissue products produced using conventional crepe blades. All of these changes affected by the use of the undulatory blade tend to correlate with improved softness perception of the tissue products.

When a wet-crepe process is employed, an impingement air dryer, a through-air dryer, or a plurality of can dryers can be used instead of a Yankee. Impingement air dryers are disclosed in the following patents and applications, the disclosure of which is incorporated herein by reference: U.S. Pat. No. 5,865,955 of Ilvespaaet et al. U.S. Pat. No. 5,968,590 of Ahonen et al. U.S. Pat. No. 6,001,421 of Ahonen et al. U.S. Pat. No. 6,119,362 of Sundqvist et al. U.S. patent application Ser. No. 09/733,172, entitled Wet Crepe, Impingement-Air Dry Process for Making Absorbent Sheet, now U.S. Pat. No. 6,432,267. A throughdrying unit as is well known in the art and described in U.S. Pat. No. 3,432,936 to Cole et al., the disclosure of which is incorporated herein by reference as is U.S. Pat. No. 5,851,353 which discloses a can-drying system.

Figure 17:
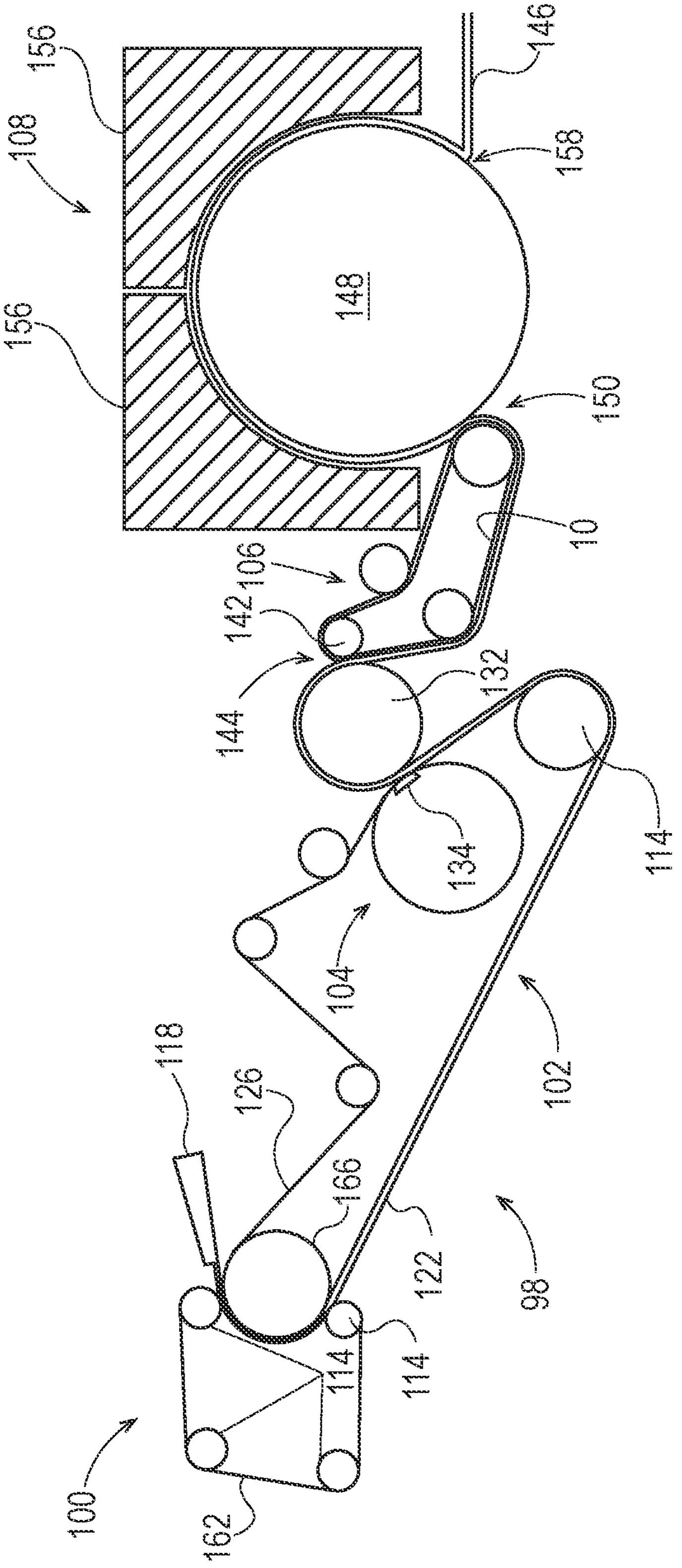
FIG. 17 is a schematic representation of another example of a fabric creped papermaking process for making a sanitary tissue product according to the present invention.

There is shown in FIG. 17 a papermaking machine 98, similar to FIG. 16, for use in connection with the present invention. Papermaking machine 98 is a three fabric loop machine having a forming section 100 generally referred to in the art as a crescent former. Forming section 100 includes a forming wire 162 supported by a plurality of rolls such as rolls 114. The forming section 100 also includes a forming roll 166 which supports paper making felt 126 such that embryonic fibrous structure 122 is formed directly on the felt 126. Felt run 102 extends to a shoe press section 104 wherein the moist embryonic fibrous structure 122 is deposited on a transfer roll 132 (also referred to sometimes as a backing roll) as described above. Thereafter, embryonic fibrous structure 122 is creped onto molding member 10 according to the present invention, such as a crepe fabric (fabric creping belt), in molding member nip 144 before being deposited on Yankee dryer 148 in another press nip 150. The papermaking machine 98 may include a vacuum turning roll, in some embodiments; however, the three loop system may be configured in a variety of ways wherein a turning roll is not necessary. This feature is particularly important in connection with the rebuild of a papermachine inasmuch as the expense of relocating associated equipment i.e. pulping or fiber processing equipment and/or the large and expensive drying equipment such as the Yankee dryer or plurality of can dryers would make a rebuild prohibitively expensive unless the improvements could be configured to be compatible with the existing facility.

Figure 18:
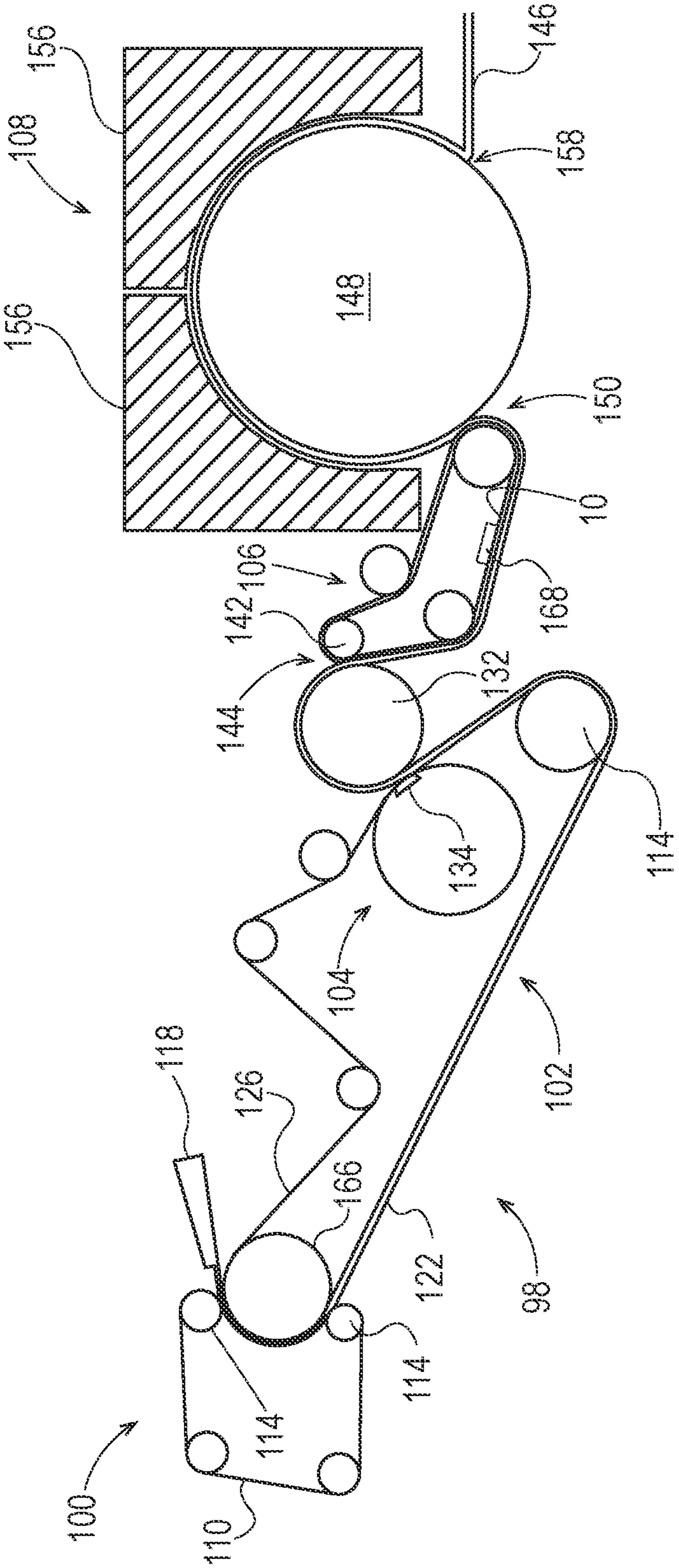
FIG. 18 is a schematic representation of an example of belt creped papermaking process for making a sanitary tissue product according to the present invention.

FIG. 18 shows another example of a suitable papermaking process to make the fibrous structures of the present invention. FIG. 18 illustrates a papermaking machine 98 for use in connection with the present invention. Papermaking machine 98 is a three fabric loop machine having a forming section 100, generally referred to in the art as a crescent former. Forming section 100 includes headbox 118 depositing a furnish on forming wire 110 supported by a plurality of rolls 114. The forming section 100 also includes a forming roll 166, which supports papermaking felt 126, such that embryonic fibrous structure 122 is formed directly on felt 126. Felt run 102 extends to a shoe press section 104 wherein the moist embryonic fibrous structure 122 is deposited on a transfer roll 132 and wet-pressed concurrently with the transfer. Thereafter, embryonic fibrous structure 122 is transferred to the molding member section 106, by being transferred to and/or creped onto molding member 10 according to the present invention, such as a creping belt (belt creping) in molding member nip 144, for example belt crepe nip, before being optionally vacuum drawn by suction box 168 and then deposited on Yankee dryer 148 in another press nip 150 using a creping adhesive, as noted above. Transfer to a Yankee dryer from the creping belt differs from conventional transfers in a conventional wet press (CWP) from a felt to a Yankee. In a CWP process, pressures in the transfer nip may be 500 PLI (87.6 kN/meter) or so, and the pressured contact area between the Yankee surface and the fibrous structure is close to or at 100%. The press roll may be a suction roll which may have a P&J hardness of 25-30. On the other hand, a belt crepe process of the present invention typically involves transfer to a Yankee with 4-40% pressured contact area between the fibrous structure and the Yankee surface at a pressure of 250-350 PLI (43.8-61.3 kN/meter). No suction is applied in the transfer nip, and a softer pressure roll is used, P&J hardness 35-45. The papermaking machine may include a suction roll, in some embodiments; however, the three loop system may be configured in a variety of ways wherein a turning roll is not necessary. This feature is particularly important in connection with the rebuild of a papermachine inasmuch as the expense of relocating associated equipment, i.e., the headbox, pulping or fiber processing equipment and/or the large and expensive drying equipment, such as the Yankee dryer or plurality of can dryers, would make a rebuild prohibitively expensive, unless the improvements could be configured to be compatible with the existing facility.

Non-limiting Examples of Methods for Making Fibrous structures

The following illustrates a non-limiting example for a preparation of a fibrous structure and/or sanitary tissue product according to the present invention on a pilot-scale Fourdrinier fibrous structure making (papermaking) machine.

Example 1

An aqueous slurry of eucalyptus (Fibria Brazilian bleached hardwood kraft pulp) pulp fibers is prepared at about 3% fiber by weight using a conventional repulper, then transferred to the hardwood fiber stock chest. The eucalyptus fiber slurry of the hardwood stock chest is pumped through a stock pipe to a hardwood fan pump where the slurry consistency is reduced from about 3% by fiber weight to about 0.15% by fiber weight. The 0.15% eucalyptus slurry is then pumped and equally distributed in the top and bottom chambers of a multi-layered, three-chambered headbox of a Fourdrinier wet-laid papermaking machine.

Additionally, an aqueous slurry of NSK (Northern Softwood Kraft) pulp fibers is prepared at about 3% fiber by weight using a conventional repulper, then transferred to the softwood fiber stock chest. The NSK fiber slurry of the softwood stock chest is pumped through a stock pipe to be refined to a Canadian Standard Freeness (CSF) of about 630. The refined NSK fiber slurry is then directed to the NSK fan pump where the NSK slurry consistency is reduced from about 3% by fiber weight to about 0.15% by fiber weight. The 0.15% NSK slurry is then directed and distributed to the center chamber of a multi-layered, three-chambered headbox of a Fourdrinier wet-laid papermaking machine.

In order to impart temporary wet strength to the finished fibrous structure, a 1% dispersion of temporary wet strengthening additive (e.g., Fennorez® 91 commercially available from Kemira) is prepared and is added to the NSK fiber stock pipe at a rate sufficient to deliver 0.28% temporary wet strengthening additive based on the dry weight of the NSK fibers. The absorption of the temporary wet strengthening additive is enhanced by passing the treated slurry through an in-line mixer.

The wet-laid papermaking machine has a layered headbox having a top chamber, a center chamber, and a bottom chamber where the chambers feed directly onto the forming wire (Fourdrinier wire). The eucalyptus fiber slurry of 0.15% consistency is directed to the top headbox chamber and bottom headbox chamber. The NSK fiber slurry is directed to the center headbox chamber. All three fiber layers are delivered simultaneously in superposed relation onto the Fourdrinier wire to form thereon a three-layer embryonic fibrous structure (web), of which about 35% of the top side is made up of the eucalyptus fibers, about 20% is made of the eucalyptus fibers on the center/bottom side and about 45% is made up of the NSK fibers in the center/bottom side. Dewatering occurs through the Fourdrinier wire and is assisted by a deflector and wire table vacuum boxes. The Fourdrinier wire is an 84M (84 by 76 5A, Albany International). The speed of the Fourdrinier wire is about 815 feet per minute (fpm).

The embryonic wet fibrous structure is transferred from the Fourdrinier wire, at a fiber consistency of about 18-22% at the point of transfer, to a molding member according to the present invention, such as the molding member shown in FIGS. 5 and 6, which can also be referred to as 3D patterned, semi-continuous knuckle, through-air-drying belt. The speed of the 3D patterned through-air-drying belt is about 800 feet per minute (fpm), which is 2% slower than the speed of the Fourdrinier wire. The 3D patterned through-air-drying belt is designed to yield a fibrous structure as shown in FIG. 3 comprising a pattern of semi-continuous high density knuckle regions substantially oriented in the machine direction having discrete pillow regions dispersed along the length of the knuckle regions. Each semi-continuous high density knuckle (a semi-continuous pillow region) region substantially oriented in the machine direction is separated by a low density pillow region substantially oriented in the machine direction. This 3D patterned through-air-drying belt is formed by casting a layer of an impervious resin surface of semi-continuous knuckles onto a fiber mesh reinforcing member 6 similar to that shown in FIG. 5. The supporting fabric is a 98×52 filament, dual layer fine mesh. The thickness of the resin cast is about 15 mils above the supporting fabric, i.e., in the Z-direction as shown in FIG. 6. The semi-continuous knuckles and pillows can be straight, curvilinear, or partially straight or partially curvilinear.

Further de-watering of the fibrous structure is accomplished by vacuum assisted drainage until the fibrous structure has a fiber consistency of about 20% to 30%.

While remaining in contact with the molding member (3D patterned through-air-drying belt), the fibrous structure is pre-dried by air blow-through pre-dryers to a fiber consistency of about 50-65% by weight.

After the pre-dryers, the semi-dry fibrous structure is transferred to a Yankee dryer and adhered to the surface of the Yankee dryer with a sprayed creping adhesive. The creping adhesive is an aqueous dispersion with the actives consisting of about 80% polyvinyl alcohol (PVA 88-44), about 20% UNICREPE® 457T20. UNICREPE® 457T20 is commercially available from GP Chemicals. The creping adhesive is delivered to the Yankee surface at a rate of about 0.10-0.20% adhesive solids based on the dry weight of the fibrous structure. The fiber consistency is increased to about 96-99% before the fibrous structure is dry-creped from the Yankee with a doctor blade.

The doctor blade has a bevel angle of about 25° and is positioned with respect to the Yankee dryer to provide an impact angle of about 81°. The Yankee dryer is operated at a temperature of about 350° F. and a speed of about 800 fpm. The fibrous structure is wound in a roll (parent roll) using a surface driven reel drum having a surface speed of about 720 fpm.

Two parent rolls of the fibrous structure are then converted into a sanitary tissue product by loading the roll of fibrous structure into an unwind stand. The two parent rolls are converted with the low density pillow side out (fabric side out or "FSO"). The line speed is 900 ft/min. One parent roll of the fibrous structure is unwound and transported to an emboss stand where the fibrous structure is strained to form an emboss pattern in the fibrous structure via a pressure roll nip and then combined with the fibrous structure from the other parent roll to make a multi-ply (2-ply) sanitary tissue product. Approximately 0.5% of a quaternary amine softener is added to the top side only of the multi-ply sanitary tissue product. The multi-ply sanitary tissue product is then transported to a winder where it is wound onto a core to form a log. The log of multi-ply sanitary tissue product is then transported to a log saw where the log is cut into finished multi-ply sanitary tissue product rolls. The sanitary tissue product is soft, flexible and absorbent and has a high surface void volume.

Example 2

A fibrous structure is made as described in Example 1 except the fiber content is as follows: about 27% of the bottom side is made up of the eucalyptus fibers, about 20% is made of the eucalyptus fibers on the center/top side and about 53% is made up of the NSK fibers in the center/top side. Two parent rolls of the fibrous structure are then converted into a sanitary tissue product by loading the roll of fibrous structure into an unwind stand. The two parent rolls are converted with the low density pillow side in (wire side out or "WSO"). The line speed is 900 ft/min. One parent roll of the fibrous structure is unwound and transported to an emboss stand where the fibrous structure is strained to form an emboss pattern in the fibrous structure via a pressure roll nip and then combined with the fibrous structure from the other parent roll to make a multi-ply (2-ply) sanitary tissue product. Approximately 0.5% of a quaternary amine softener is added to the top side only of the multi-ply sanitary tissue product. The multi-ply sanitary tissue product is then transported to a winder where it is wound onto a core to form a log. The log of multi-ply sanitary tissue product is then transported to a log saw where the log is cut into finished multi-ply sanitary tissue product rolls. The sanitary tissue product is soft, flexible and absorbent and has a high surface void volume.

Example 3

A fibrous structure is made as described in Example 2 except the fiber content is as follows: about 35% of the bottom side is made up of the eucalyptus fibers, about 15% is made of the eucalyptus fibers on the center/top side and about 50% is made up of the NSK fibers in the center/top side. The sanitary tissue product is soft, flexible and absorbent and has a high surface void volume.

Example 4

A fibrous structure is made as described in Example 2 except the fiber content is as follows: about 35% of the bottom side is made up of the eucalyptus fibers, about 10% is made of the eucalyptus fibers on the center/top side and about 55% is made up of the NSK fibers in the center/top side. The sanitary tissue product is soft, flexible and absorbent and has a high surface void volume.

Example 5

A fibrous structure is made as described in Example 2 except the fiber content is as follows: about 40% of the bottom side is made up of the eucalyptus fibers, about 5% is made of the eucalyptus fibers on the center/top side and about 55% is made up of the NSK fibers in the center/top side. The sanitary tissue product is soft, flexible and absorbent and has a high surface void volume.

Example 6

A fibrous structure is made as described in Example 2 except the fiber content is as follows: about 40% of the bottom side is made up of the eucalyptus fibers, about 10% is made of the eucalyptus fibers on the center/top side and about 50% is made up of the NSK fibers in the center/top side. The sanitary tissue product is soft, flexible and absorbent and has a high surface void volume.

Example 7

A fibrous structure is made as described in Example 2 except the fiber content is as follows: about 45% of the bottom side is made up of the eucalyptus fibers, about 10% is made of the eucalyptus fibers on the center/top side and about 45% is made up of the NSK fibers in the center/top side. The sanitary tissue product is soft, flexible and absorbent and has a high surface void volume.

Example 8

A fibrous structure is made as described in Example 1 except the fiber content is as follows: about 27% of the top side is made up of the eucalyptus fibers, about 20% is made of the eucalyptus fibers on the center/bottom side and about 53% is made up of the NSK fibers in the center/bottom side. The sanitary tissue product is soft, flexible and absorbent and has a high surface void volume.

Example 9

A fibrous structure is made as described in Example 1 except the fiber content is as follows: about 35% of the top side is made up of the eucalyptus fibers, about 15% is made of the eucalyptus fibers on the center/bottom side and about 50% is made up of the NSK fibers in the center/bottom side. The sanitary tissue product is soft, flexible and absorbent and has a high surface void volume.

Example 10

A fibrous structure is made as described in Example 1 except the fiber content is as follows: about 35% of the top side is made up of the eucalyptus fibers, about 10% is made of the eucalyptus fibers on the center/bottom side and about 55% is made up of the NSK fibers in the center/bottom side. The sanitary tissue product is soft, flexible and absorbent and has a high surface void volume.

Example 11

A fibrous structure is made as described in Example 1 except the fiber content is as follows: about 40% of the top side is made up of the eucalyptus fibers, about 5% is made of the eucalyptus fibers on the center/bottom side and about 55% is made up of the NSK fibers in the center/bottom side. The sanitary tissue product is soft, flexible and absorbent and has a high surface void volume.

Example 12

A fibrous structure is made as described in Example 1 except the fiber content is as follows: about 40% of the top side is made up of the eucalyptus fibers, about 10% is made of the eucalyptus fibers on the center/bottom side and about 50% is made up of the NSK fibers in the center/bottom side. The sanitary tissue product is soft, flexible and absorbent and has a high surface void volume.

Example 13

A fibrous structure is made as described in Example 1 except the fiber content is as follows: about 45% of the top side is made up of the eucalyptus fibers, about 10% is made of the eucalyptus fibers on the center/bottom side and about 45% is made up of the NSK fibers in the center/bottom side. The sanitary tissue product is soft, flexible and absorbent and has a high surface void volume.

Test Methods

Unless otherwise specified, all tests described herein including those described under the Definitions section and the following test methods are conducted on samples that have been conditioned in a conditioned room at a temperature of 23° C.±1.0° C. and a relative humidity of 50%±2% for a minimum of 2 hours prior to the test. The samples tested are "usable units." "Usable units" as used herein means sheets, flats from roll stock, pre-converted flats, and/or single or multi-ply products. All tests are conducted in such conditioned room. Do not test samples that have defects such as wrinkles, tears, holes, and like. All instruments are calibrated according to manufacturer's specifications.

Basis Weight Test Method

Basis weight of a fibrous structure and/or sanitary tissue product is measured on stacks of twelve usable units using a top loading analytical balance with a resolution of ±0.001 g. The balance is protected from air drafts and other disturbances using a draft shield. A precision cutting die, measuring 3.500 in ±0.0035 in by 3.500 in ±0.0035 in is used to prepare all samples.

With a precision cutting die, cut the samples into squares. Combine the cut squares to form a stack twelve samples thick. Measure the mass of the sample stack and record the result to the nearest 0.001 g.

The Basis Weight is calculated in lbs/3000 ft$^2$ or g/m$^2$ as follows:

Basis Weight=(Mass of stack)/[(Area of 1 square in stack)×(No. of squares in stack)]

For example,

Basis Weight (lbs/3000 ft$^2$)=[[Mass of stack (g)/453.6 (g/lbs)]/[12.25 (in$^2$)/144 (in$^2$/ft$^2$)×1211×3000 or,

Basis Weight (g/m$^2$)=Mass of stack (g)/[79.032 (cm$^2$)/10,000 (cm$^2$/m$^2$)×12]

Report result to the nearest 0.1 lbs/3000 ft$^2$ or 0.1 g/m$^2$. Sample dimensions can be changed or varied using a similar precision cutter as mentioned above, so as at least 100 square inches of sample area in stack.

Caliper Test Method

Caliper of a fibrous structure and/or sanitary tissue product is measured using a ProGage Thickness Tester (Thwing-Albert Instrument Company, West Berlin, NJ) with a pressure foot diameter of 2.00 inches (area of 3.14 in$^2$) at a pressure of 95 g/in$^2$. Four (4) samples are prepared by cutting of a usable unit such that each cut sample is at least 2.5 inches per side, avoiding creases, folds, and obvious defects. An individual specimen is placed on the anvil with the specimen centered underneath the pressure foot. The foot is lowered at 0.03 in/sec to an applied pressure of 95 g/in$^2$. The reading is taken after 3 sec dwell time, and the foot is raised. The measure is repeated in like fashion for the remaining 3 specimens. The caliper is calculated as the average caliper of the four specimens and is reported in mils (0.001 in) to the nearest 0.1 mils.

Density Test Method

The density of a fibrous structure and/or sanitary tissue product is calculated as the quotient of the Basis Weight of a fibrous structure or sanitary tissue product expressed in lbs/3000 ft2 divided by the Caliper (at 95 g/in$^2$) of the fibrous structure or sanitary tissue product expressed in mils. The final Density value is calculated in lbs/ft3 and/or g/cm3, by using the appropriate converting factors.

Total Pillow Perimeter Test Method

The Total Pillow Perimeter value of a fibrous structure can be determined from a molding member upon which the fibrous structure is made and/or from the fibrous structure itself as follows:

a. Molding Member

If one has access to the molding member upon which the fibrous structure was made, i. the discrete pillow perimeter (for example a circle pillow perimeter) is the total measured length of the line (edge of resin) forming the boundary between the knuckles and the discrete pillows. For example, if the molding member's pattern has a repeat unit, then the discrete pillow perimeter of a repeat unit is the line forming the boundary between the knuckles and the discrete pillows of the repeat unit.

ii. the semi-continuous pillow perimeter (for example a line pillow perimeter) is the total measured length of the line (edge of resin) forming the boundary between the knuckles and the semi-continuous pillows. For example, if the molding member's pattern has a repeat unit, then the semi-continuous pillow perimeter of a repeat unit is the line forming the boundary between the knuckles and the semi-continuous pillows of the repeat unit.

iii. the continuous pillow perimeter is the total measured length of the line (edge of resin) forming the boundary between the knuckles and the continuous pillows. For example, if the molding member's pattern has a repeat unit, then the continuous pillow perimeter of a repeat unit is the line forming the boundary between the knuckles and the continuous pillows of the repeat unit.

iv. Total Pillow Perimeter value is the total measured length of the line (edge of resin) forming the boundary between all of the knuckles and all of the pillows, for example the discrete pillow perimeter value+semi-continuous pillow perimeter value+continuous pillow perimeter value. For example, if the molding member's pattern has a repeat unit, then the total pillow perimeter of a repeat unit is the line forming the boundary between the knuckles and the pillows of the repeat unit.

v. Area is the entire area of the knuckles and pillows. For example, if the molding member's pattern has a repeat unit, then the area is the entire area of the repeat unit including the knuckles and the pillows.

vi. Discrete Pillow Perimeter/Area can be calculated.

vii. Semi-Continuous Pillow Perimeter/Area can be calculated.

viii. Total Pillow Perimeter/Area can be calculated.

b. Fibrous Structure

To determine the Total Pillow Perimeter value from a fibrous structure:

i. Obtain clean, unaltered, undamaged, new sample of fibrous structure to be measured.

ii. the discrete pillow perimeter (for example a circle pillow perimeter) is the total measured length of the line (transition zone) forming the boundary between the non-pillow regions and adjacent discrete pillow regions, if any.

iii. the semi-continuous pillow perimeter (for example a line pillow perimeter) is the total measured length of the line (transition zone) forming the boundary between the non-pillow regions and adjacent semi-continuous pillow regions.

iv. the continuous pillow perimeter is the total measured length of the line (transition zone) forming the boundary between the non-pillow regions and adjacent continuous pillow regions.

v. Total Pillow Perimeter value is the total measured length of the line (transition zone) forming the boundary between all of the non-pillow regions and all of the adjacent pillow regions, for example the discrete pillow perimeter value+semi-continuous pillow perimeter value+continuous pillow perimeter value.

vi. For example, some fibrous structures comprise 3D patterned ripples. In order to measure the semi-continuous pillow perimeter of a fibrous structure comprising ripples, one measures the length of the boundary of a ripple (straight or curvilinear) in a sheet along the ripple's transition zone between the ripple pillow region and the adjacent non-pillow region. Once the semi-continuous pillow perimeter has been measured for one ripple, since it is a repeating pattern, one can count the number of ripples per sheet and then multiply the number of ripples per sheet by the perimeter of a ripple to arrive at the Total Ripple (Pillow) Perimeter value.

vii. Area of a sheet is the sheet width×sheet length.

viii. Discrete Pillow Perimeter/Area is calculated.

ix. Semi-Continuous Pillow Perimeter/Area is calculated.

x. Total Pillow Perimeter/Area is calculated.

Surface Void Volume Test Method

The Surface Void Volume measurement is obtained from analysis of a 3D surface topography image of a fibrous structure sample while under a uniform compressive pressure. The image is obtained using an optical 3D surface topography measurement system (a suitable optical 3D surface topography measurement system is the MikroCAD Premium instrument commercially available from LMI Technologies Inc., Vancouver, Canada, or equivalent). The system includes the following main components: a) a Digital Light Processing (DLP) projector with direct digital controlled micro-mirrors; b) a CCD camera with at least a 1600×1200 pixel resolution; c) projection optics adapted to a measuring area of at least 60 mm×45 mm; d) recording optics adapted to a measuring area of 60 mm×45 mm; e) a table tripod based on a small hard stone plate; f) a blue LED light source; g) a measuring, control, and evaluation computer running surface texture analysis software (a suitable software is MikroCAD software with MountainsMap technology, or equivalent); and h) calibration plates for lateral (x-y) and vertical (z) calibration available from the vendor. The uniform compressive pressure is applied to the sample by a pressure box containing a flexible bladder beneath the sample, which is pressurized by air, and a transparent window above, through which the sample surface is visible to the camera.

The optical 3D surface topography measurement system measures the surface height of a sample using the digital micro-mirror pattern fringe projection technique. The result of the measurement is a map of surface height (z-directional or z-axis) versus displacement in the x-y plane. The system has a field of view of 60×45 mm with an x-y pixel resolution of approximately 40 microns. The height resolution is set at 0.5 micron/count, with a height range of +/−15 mm. All testing is performed in a conditioned room maintained at about 23±2° C. and about 50±2% relative humidity.

The instrument is calibrated according to manufacturer's specifications using the calibration plates for lateral (x-y axis) and vertical (z axis) available from the vendor.

Figure 19:
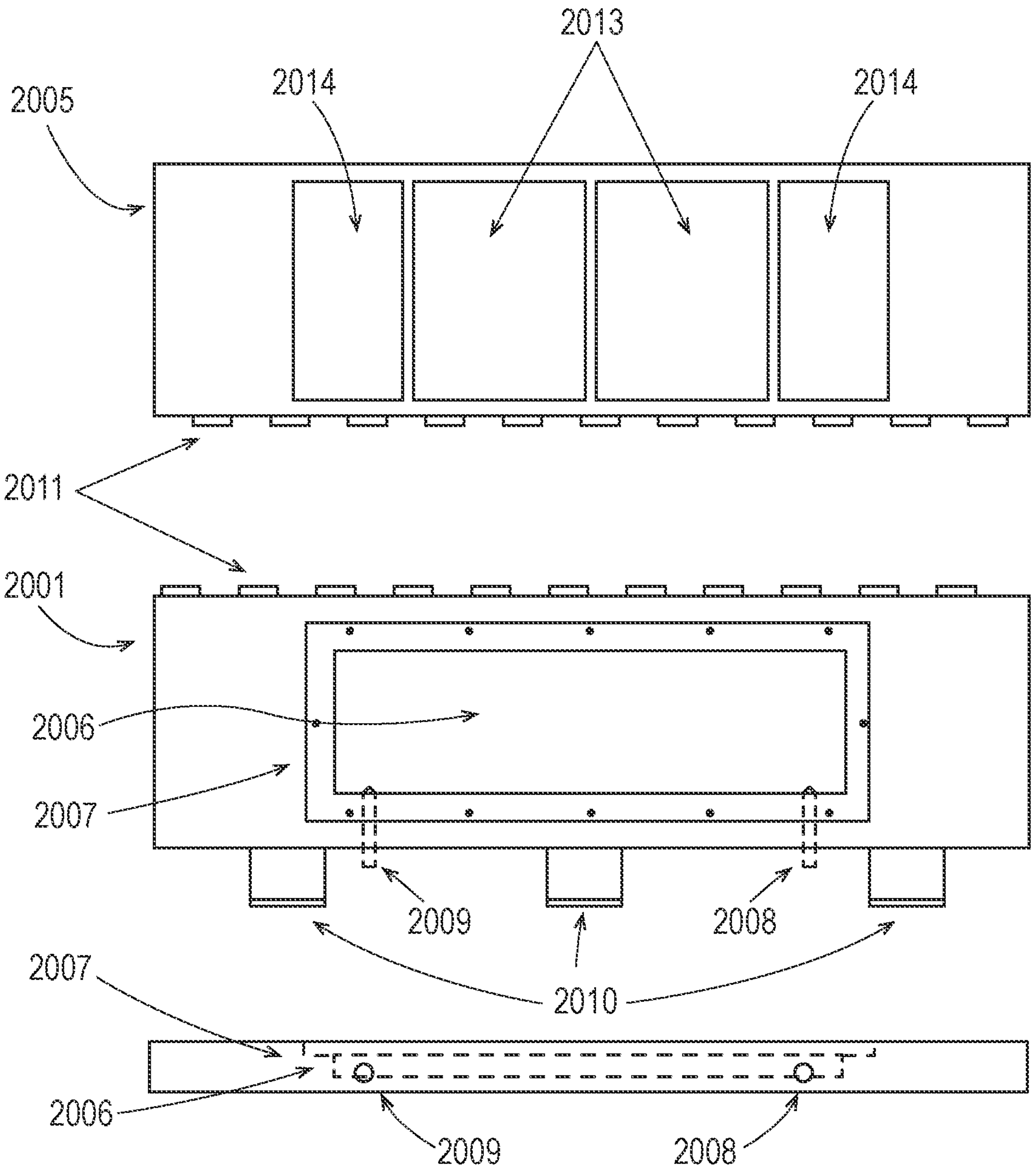
FIG. 19 is a schematic representation of a pressure box and its components used in the Surface Void Volume Test Method.
Figure 20:
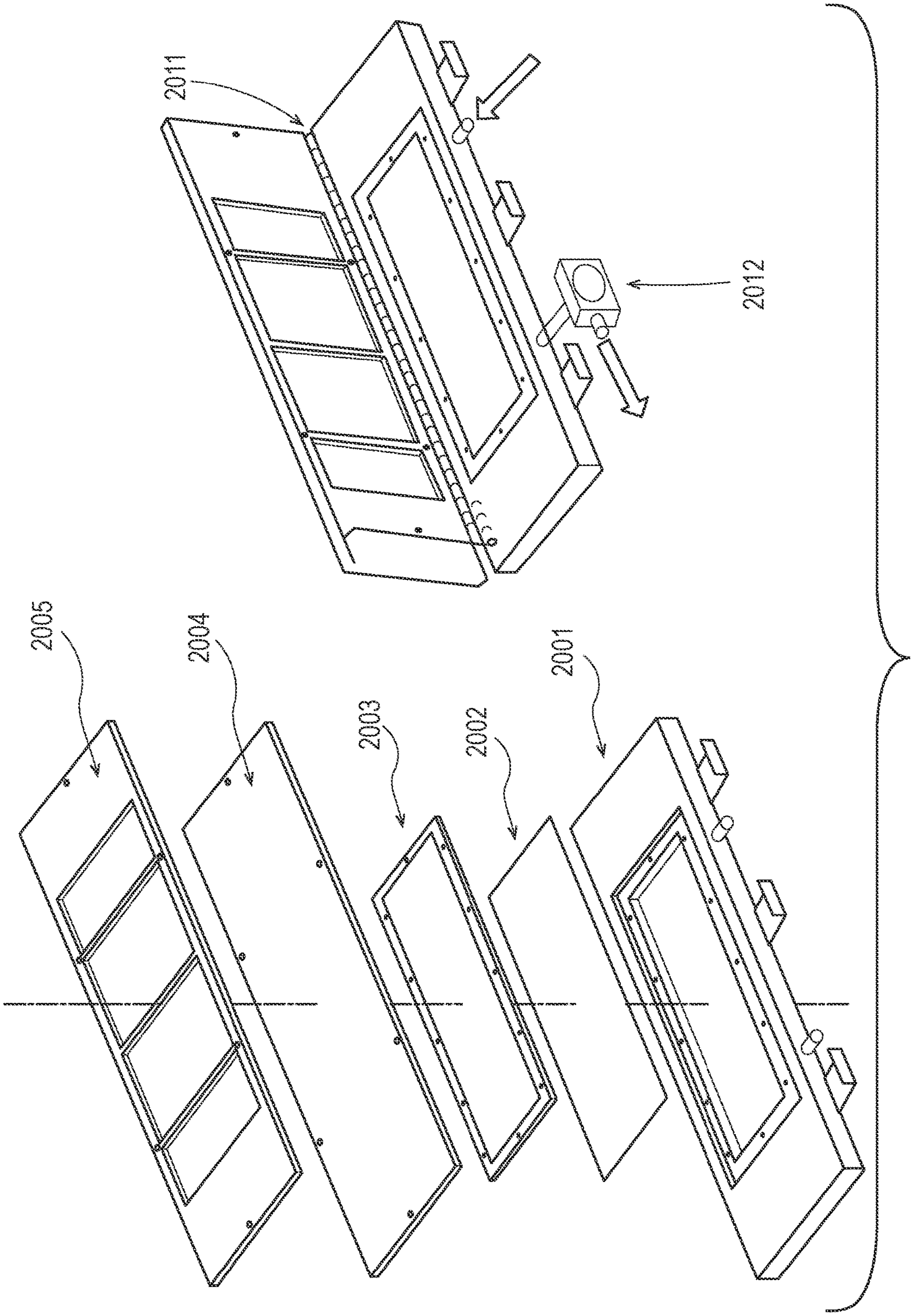
FIG. 20 is a schematic representation of a pressure box and its components used in the Surface Void Volume Test Method.

Referring to FIGS. 19 and 20, the pressure box consists of a Delrin base 2001 a silicone bladder 2002, an aluminum frame 2003 to attach the bladder (e.g. Bisco HT-6220, solid silicone elastomer, 0.20 in. thickness with a durometer Shore A of 20 pts; (available from Marian Chicago Inc., Chicago IL, or equivalent) to the Base 2001, an acrylic window 2004 and an aluminum lid 2005. The base 2001 is 24.0 in. long by 7.0 in. wide and 1.0 in. thick. It has a rectangular well 2006 routed into the base that is 4.0 in. wide by 14.5 in. long by 0.7 in. deep and is centered within the base. The well has a rectangular counter sink 2007 that is 0.5 in. deep and extends 0.75 in. from the edges of the well. The frame 2003 is 0.5 in. wide by 0.25 in. thick and fits within the lip of the well. The frame is used to attach the bladder 2002 to the base using 12 screws. The base has two thru holes 2008 and 2009 that are used to introduce and regulate pressurized air from underneath the bladder 2002. A back pressure regulator 2012 is used to adjust the pressure within the system. The lid 2005 is 24.0 in. long by 7.0 in. wide and 0.25 in. thick. It has four cutouts panes; the two center panes 2013 are 6.0 in. wide by 4.75 in. long and the two outbound 2014 panes are 6 in. wide by 3.0 in. long. There are three 0.25 in. bridges 2015 between the panes. The window 2004 is made of transparent acrylic that is 24.0 in. long by 7.0 in. wide and 0.125 in. thick. The window 2004 is attached to the lid 2005 using six screws. The lid and window assembly are attached to the base with a hinge 2011 along its side that aligns the two parts and secures them along the edge. When closed, the window rest flush with the top of the base. Three clamps 2010, which are attached to the base with hinges, are closed to secure the lid 2005 with the base 2001.

Test samples are prepared by cutting square samples of a fibrous structure. Test samples are cut to a length and width of about 90 mm to ensure the sample fills the camera's field of view. Test samples are selected to avoid perforations, creases or folds within the testing region. Prepare five (5) substantially similar replicate samples for testing. Equilibrate all samples at TAPPI standard temperature and relative humidity conditions (23° C.±2 C.° and 50%±2%) for at least 1 hour prior to conducting the measurement, which is also conducted under TAPPI conditions. The fibrous structure sample is laid flat on the bladder 2002 surface, and is sealed inside the pressure box so that the entire region of the sample surface to be measured is visible through a center pane 2013 in the lid 2005. The pressure box is then placed on the table with the center pane directly beneath the camera so that the sample surface fills the entire field of view. The pressure is steadily raised to 0.88 psi within approximately 60 seconds.

Without delay a height image (z-direction) of the sample is collected by following the instrument manufacturer's recommended measurement procedures, which may include, focusing the measurement system and performing a brightness adjustment. No pre-filtering options should be utilized. The collected height image file is saved to the evaluation computer running the surface texture analysis software.

Immediately following the image collection at the lower pressure, the pressure in the box is steadily raised to 1.7 psi within approximately 60 seconds, and the image collection procedure is repeated.

Analysis of a surface height image is initiated by opening the image in the surface texture analysis software. A recommended filtration process is described in ISO 25178-2:2012. Accordingly, the following filtering procedure is performed on each image: 1) a Gaussian low pass S-filter with a nesting index (cut-off) of 2.5 μm; 2) an F-operation of removing the least squares plane; and 3) a Gaussian high pass L-filter with a nesting index (cut-off) of 25 mm (ISO 16610-61). Both Gaussian filters are run utilizing end effect correction. This filtering procedure produces the S-L surface from which the areal surface texture parameters will be calculated.

Select the entire field of view for measurement, and calculate the areal surface void volume parameter on the S-L Surface.

The Surface Void Volume measurement is based on the Core Void Volume (Vvc) parameter which is described in ISO 25178-2:2012. The parameter Vvc is derived from the Areal Material Ratio (Abbott-Firestone) curve described in the ISO 13565-2:1996 standard extrapolated to surfaces, it is the cumulative curve of the surface height distribution histogram versus the range of surface heights. A material ratio is the ratio, given as a %, of the intersecting area of a plane passing through the surface at a given height to the cross sectional area of the evaluation region. Vvc is the difference in void volume between p and q material ratios. The Surface Void Volume is the volume of void space above the surface of the sample between the height corresponding to a material ratio value of 2% to the material ratio of 98%, which is the Vvc parameter calculated with a p value of 2% and q value of 98%. The units of Surface Void Volume are $mm^3/mm^2$.

The Surface Void Volume of the five replicate fibrous structure samples are measured at both the 0.88 psi and 1.7 psi. The five Surface Void Volume values at each pressure are averaged together, and each is reported to the nearest 0.001 $mm^3/m^2$.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A fibrous structure comprising a surface comprising a three-dimensional surface pattern, wherein the three-dimensional surface pattern comprises a plurality of discrete pillow regions present in at least one semi-continuous non-pillow region:

wherein the surface exhibits a Total Pillow Perimeter value of at least 30 in/in$^2$ as measured according to the Total Pillow Perimeter Test Method such that the fibrous structure exhibits a Surface Void Volume value at 1.7 psi of at least 0.090 mm$^3$/mm$^2$ as measured according to the Surface Void Volume Test Method.

2. The fibrous structure according to claim 1 wherein the fibrous structure exhibits a Surface Void Volume value at 1.7 psi of at least 0.092 mm$^3$/mm$^2$ as measured according to the Surface Void Volume Test Method.

3. The fibrous structure according to claim 1 wherein the fibrous structure exhibits a Surface Void Volume value at 0.88 psi of at least 0.108 mm$^3$/mm$^2$ as measured according to the Surface Void Volume Test Method.

4. The fibrous structure according to claim 1 wherein the fibrous structure comprises a plurality of fibrous elements.

5. The fibrous structure according to claim 4 wherein the plurality of fibrous elements comprise a plurality of fibers.

6. The fibrous structure according to claim 5 wherein at least one of the fibers comprises a pulp fiber.

7. The fibrous structure according to claim 6 wherein the pulp fiber comprises a wood pulp fiber.

8. The fibrous structure according to claim 6 wherein the pulp fiber comprises a non-wood pulp fiber.

9. The fibrous structure according to claim 1 wherein the surface further comprises a surface softening agent.

10. The fibrous structure according to claim 1 wherein the fibrous structure comprises a temporary wet strength agent.

11. The fibrous structure according to claim 1 wherein the surface further comprises one or more semi-continuous pillow regions.

12. The fibrous structure according to claim 1 wherein the plurality of discrete pillow regions comprises at least one discrete pillow region that exhibits a Discrete Pillow Perimeter value of at least 5.00 as measured according to the Total Pillow Perimeter Test Method.

13. The fibrous structure according to claim 12 wherein the at least one discrete pillow region exhibits a Discrete Pillow Perimeter value of at least 10.00 as measured according to the Total Pillow Perimeter Test Method.

14. The fibrous structure according to claim 13 wherein the at least one discrete pillow region exhibits a Discrete Pillow Perimeter value of at least 15.00 as measured according to the Total Pillow Perimeter Test Method.

15. The fibrous structure according to claim 14 wherein the at least one discrete pillow region exhibits a Discrete Pillow Perimeter value of at least 18.00 as measured according to the Total Pillow Perimeter Test Method.

16. The fibrous structure according to claim 1 wherein the fibrous structure is a toilet tissue.

17. A multi-ply fibrous structure comprising at least one fibrous structure ply comprising the fibrous structure according to claim 1 and a second fibrous structure ply.

18. The multi-ply fibrous structure according to claim 17 wherein the multi-ply fibrous structure is toilet tissue.

19. A method for making a fibrous structure according to claim 1, the method comprising the steps of:

a. providing a plurality of fibrous elements;

b. collecting the fibrous elements on a collection device to form a fibrous structure; and c. imparting a three-dimensional surface pattern to a surface of the fibrous structure such that the fibrous structure comprises a three-dimensional surface pattern comprising a plurality of discrete pillow regions present in at least one semi-continuous non-pillow region.

* * * * *